US012672132B2

(12) United States Patent
Abdelghaffar et al.

(10) Patent No.: US 12,672,132 B2
(45) Date of Patent: Jun. 30, 2026

(54) RESOURCE BLOCKS IN UPLINK BAND OF SUBBAND FULL DUPLEX SYMBOL

(71) Applicant: QUALCOMM Incorporated, San Diego, CA (US)

(72) Inventors: Muhammad Sayed Khairy Abdelghaffar, San Jose, CA (US); Yi Huang, San Diego, CA (US); Abdelrahman Mohamed Ahmed Mohamed Ibrahim, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 395 days.

(21) Appl. No.: 18/347,187

(22) Filed: Jul. 5, 2023

(65) Prior Publication Data

US 2024/0163870 A1 May 16, 2024

Related U.S. Application Data

(60) Provisional application No. 63/384,081, filed on Nov. 16, 2022.

(51) Int. Cl.
*H04W 72/1268* (2023.01)
*H04L 5/14* (2006.01)
(Continued)

(52) U.S. Cl.
CPC ... *H04W 72/1268* (2013.01); *H04W 72/0446* (2013.01); *H04W 72/0457* (2023.01); *H04L 5/14* (2013.01); *H04W 72/232* (2023.01)

(58) Field of Classification Search
CPC ......... H04W 72/1268; H04W 72/0446; H04W 72/0457; H04W 72/232; H04L 5/14; (Continued)

(56) References Cited

U.S. PATENT DOCUMENTS

2020/0229180 A1* 7/2020 Liu ........................ H04L 5/0092
2021/0320779 A1 10/2021 Huang et al.
(Continued)

FOREIGN PATENT DOCUMENTS

WO 2021147114 A1 7/2021

OTHER PUBLICATIONS

International Search Report and Written Opinion—PCT/US2023/077763—ISA/EPO—Feb. 26, 2024.

*Primary Examiner* — Kwang B Yao
*Assistant Examiner* — Bradley D Lytle, Jr.
(74) *Attorney, Agent, or Firm* — Harrity & Harrity, LLP

(57) ABSTRACT

Various aspects of the present disclosure generally relate to wireless communication. In some aspects, a user equipment (UE) may receive downlink control information (DCI) that schedules a downlink message for initial access communication and that indicates a common physical uplink control channel (PUCCH) resource for feedback for the downlink message. The UE may obtain one or more resource subband physical block (PRB) offsets for transmitting the feedback in an uplink subband of a subband full duplex symbol associated with the common PUCCH resource. The UE may transmit the feedback in a first PRB for a first frequency hop in the uplink subband and in a second PRB for a second frequency hop in the uplink subband, based at least in part on the one or more subband PRB offsets. Numerous other aspects are described.

28 Claims, 20 Drawing Sheets

700 —→

SBFD slot 702

(51) Int. Cl.
*H04W 72/0446* (2023.01)
*H04W 72/0457* (2023.01)
*H04W 72/232* (2023.01)

(58) Field of Classification Search
CPC ..... H04L 5/001; H04L 5/0055; H04L 5/0092;
H04L 5/0094
USPC .................. 370/329, 330, 230, 252; 455/450
See application file for complete search history.

(56) References Cited

U.S. PATENT DOCUMENTS

| | | | |
|---|---|---|---|
| 2023/0068855 A1* | 3/2023 | Ouchi ................... | H04W 72/23 |
| 2023/0142830 A1* | 5/2023 | Myung ................. | H04L 5/0064 |
| | | | 370/329 |
| 2023/0292294 A1* | 9/2023 | Rudolf ............. | H04W 72/0446 |
| 2024/0107525 A1* | 3/2024 | Khan Beigi ......... | H04L 5/1469 |
| 2025/0150215 A1* | 5/2025 | Lee ...................... | H04L 1/1861 |

* cited by examiner

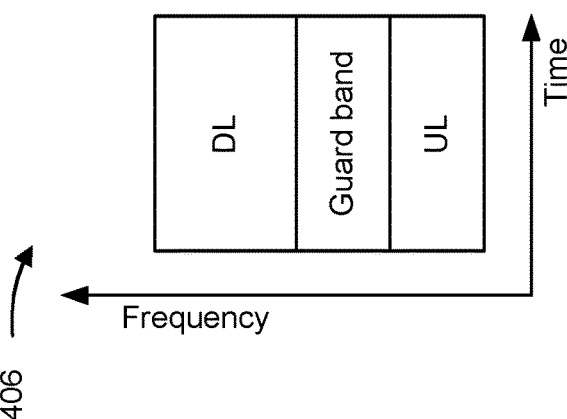
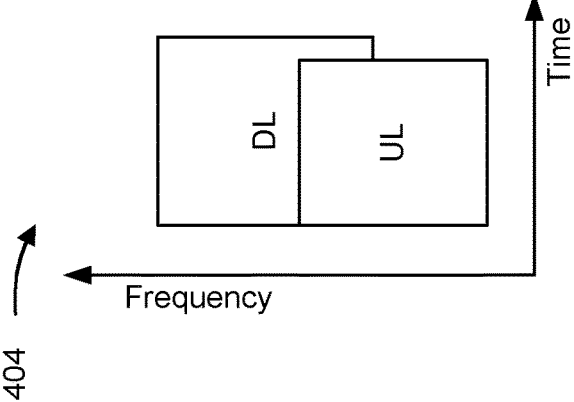
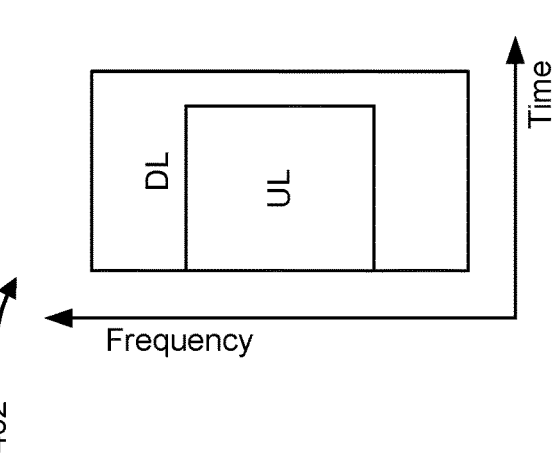
FIG. 4

500

Network Entity 1210

UE 1220

1225 Transmit DCI that schedules a downlink message and indicates PUCCH resource for feedback 1230 Obtain one or more PRB offsets for transmitting feedback 1235 Transmit feedback in a first PRB for a first frequency hop 1240 Transmit feedback in a second PRB for a second frequency hop

1200

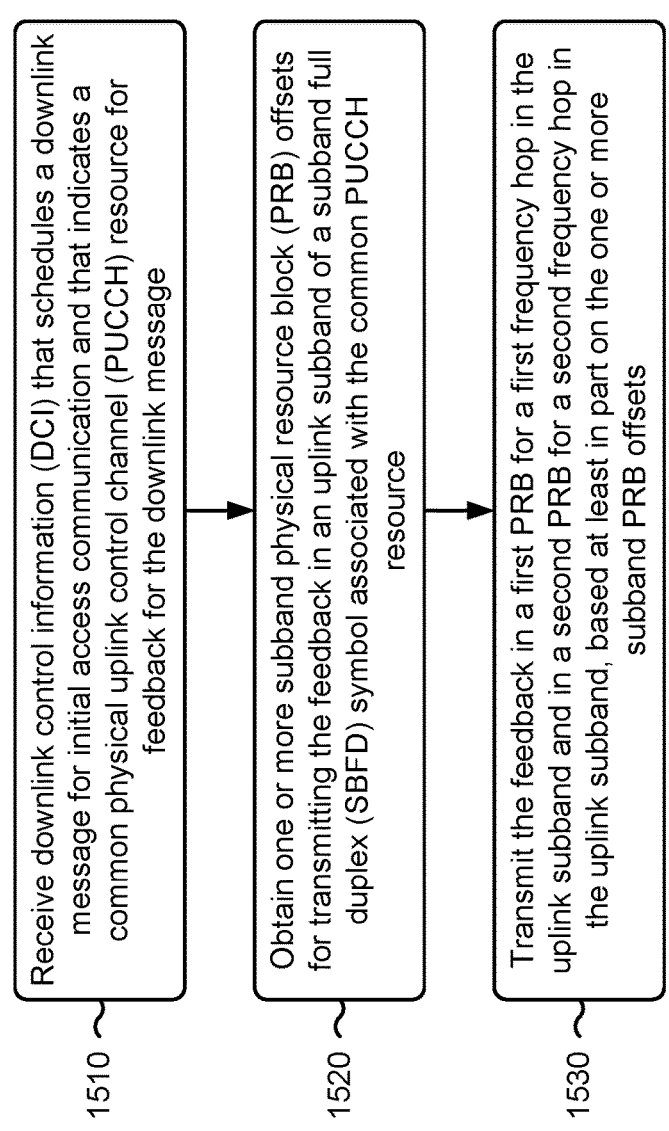

1510 Receive downlink control information (DCI) that schedules a downlink message for initial access communication and that indicates a common physical uplink control channel (PUCCH) resource for feedback for the downlink message 1520 Obtain one or more subband physical resource block (PRB) offsets for transmitting the feedback in an uplink subband of a subband full duplex (SBFD) symbol associated with the common PUCCH resource 1530 Transmit the feedback in a first PRB for a first frequency hop in the uplink subband and in a second PRB for a second frequency hop in the uplink subband, based at least in part on the one or more subband PRB offsets

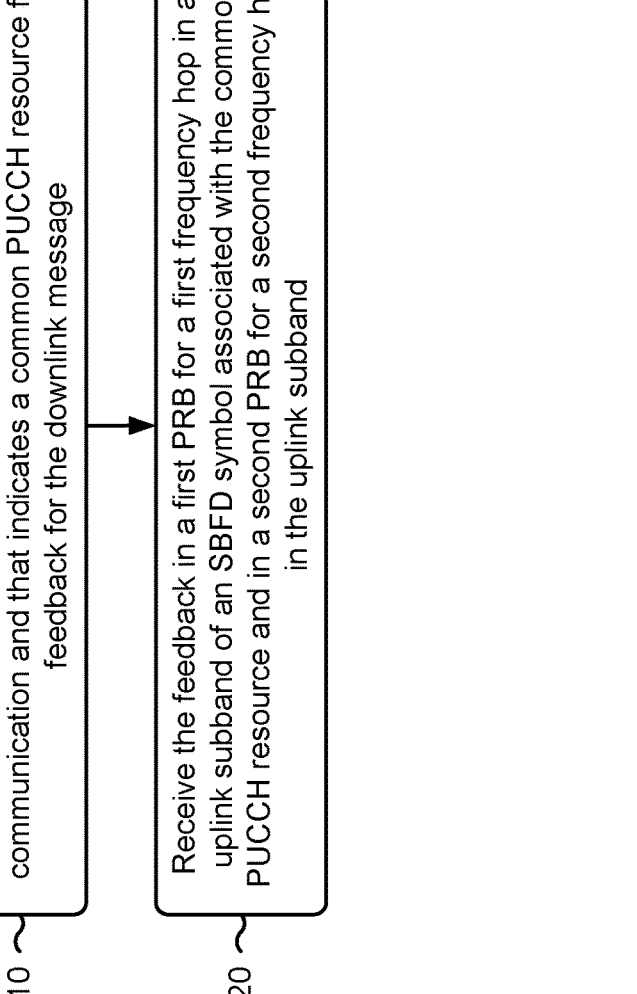

1610 Transmit DCI that schedules a downlink message for initial access communication and that indicates a common PUCCH resource for feedback for the downlink message 1620 Receive the feedback in a first PRB for a first frequency hop in an uplink subband of an SBFD symbol associated with the common PUCCH resource and in a second PRB for a second frequency hop in the uplink subband

1710 — Receive DCI that schedules a downlink message for initial access communication and that indicates a common PUCCH resource for feedback for the downlink message 1720 — Select a PUCCH resource from a data structure that includes a plurality of PUCCH resources for transmission in an uplink subband of an SBFD symbol 1730 — Transmit the feedback in the PUCCH resource

1700

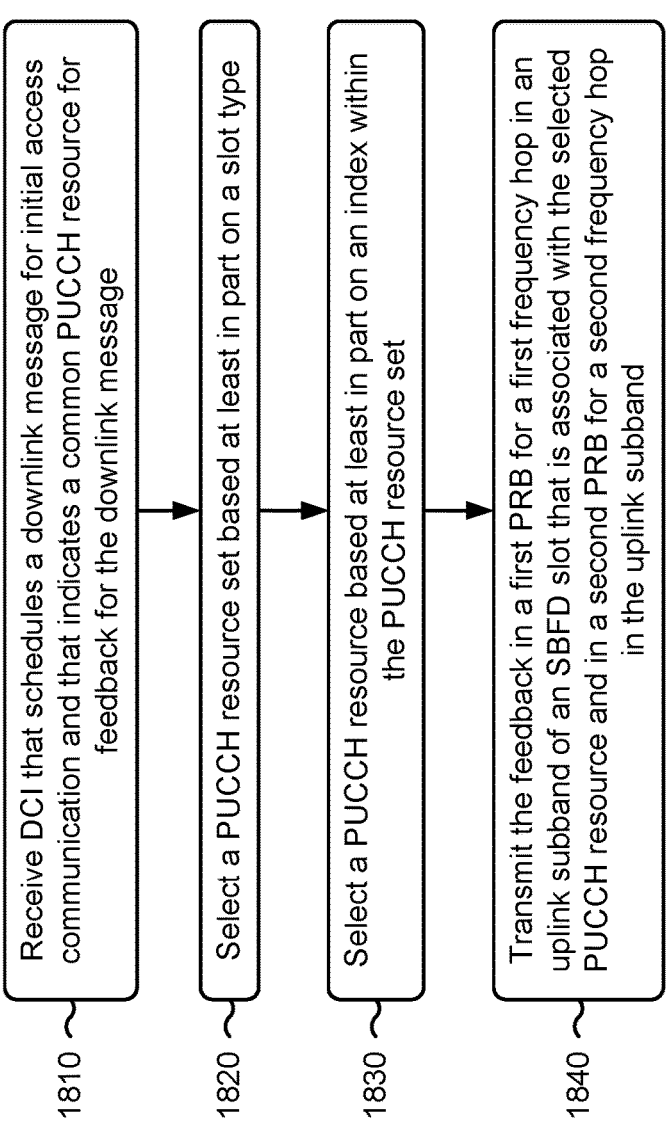

1810 — Receive DCI that schedules a downlink message for initial access communication and that indicates a common PUCCH resource for feedback for the downlink message 1820 — Select a PUCCH resource set based at least in part on a slot type 1830 — Select a PUCCH resource based at least in part on an index within the PUCCH resource set 1840 — Transmit the feedback in a first PRB for a first frequency hop in an uplink subband of an SBFD slot that is associated with the selected PUCCH resource and in a second PRB for a second frequency hop in the uplink subband

RESOURCE BLOCKS IN UPLINK BAND OF SUBBAND FULL DUPLEX SYMBOL

CROSS-REFERENCE TO RELATED APPLICATION

This Patent Application claims priority to U.S. Provisional Patent Application No. 63/384,081, filed on Nov. 16, 2022, entitled "RESOURCE BLOCKS IN UPLINK BAND OF SUBBAND FULL DUPLEX SLOT," and assigned to the assignee hereof. The disclosure of the prior Application is considered part of and is incorporated by reference into this Patent Application.

FIELD OF THE DISCLOSURE

Aspects of the present disclosure generally relate to wireless communication and specifically to techniques and apparatuses for using resource blocks in an uplink band of a subband full duplex symbol.

BACKGROUND

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth or transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, time division synchronous code division multiple access (TD-SCDMA) systems, and Long Term Evolution (LTE). LTE/LTE-Advanced is a set of enhancements to the Universal Mobile Telecommunications System (UMTS) mobile standard promulgated by the Third Generation Partnership Project (3GPP).

The above multiple access technologies have been adopted in various telecommunication standards to provide a common protocol that enables different UEs to communicate on a municipal, national, regional, or global level. New Radio (NR), which may be referred to as 5G, is a set of enhancements to the LTE mobile standard promulgated by the 3GPP. NR is designed to better support mobile broadband internet access by improving spectral efficiency, lowering costs, improving services, making use of new spectrum, and better integrating with other open standards using orthogonal frequency division multiplexing (OFDM) with a cyclic prefix (CP) (CP-OFDM) on the downlink, using CP-OFDM or single-carrier frequency division multiplexing (SC-FDM) (also known as discrete Fourier transform spread OFDM (DFT-s-OFDM)) on the uplink, as well as supporting beamforming, multiple-input multiple-output (MIMO) antenna technology, and carrier aggregation. As the demand for mobile broadband access continues to increase, further improvements in LTE, NR, and other radio access technologies remain useful.

SUMMARY

Some aspects described herein relate to a method of wireless communication performed by a user equipment (UE). The method may include receiving downlink control information (DCI) that schedules a downlink message for initial access communication and that indicates a common physical uplink control channel (PUCCH) resource for feedback for the downlink message. The method may include obtaining one or more subband physical resource block (PRB) offsets for transmitting the feedback in an uplink subband of a subband full duplex (SBFD) symbol (or slot) associated with the common PUCCH resource. The method may include transmitting the feedback in a first PRB for a first frequency hop in the uplink subband and in a second PRB for a second frequency hop in the uplink subband, based at least in part on the one or more subband PRB offsets.

Some aspects described herein relate to a method of wireless communication performed by a network entity. The method may include transmitting DCI that schedules a downlink message for initial access communication and that indicates a common PUCCH resource for feedback for the downlink message. The method may include receiving the feedback in a first PRB for a first frequency hop in an uplink subband of an SBFD symbol (or slot) associated with the common PUCCH resource and in a second PRB for a second frequency hop in the uplink subband.

Some aspects described herein relate to a method of wireless communication performed by a UE. The method may include receiving DCI that schedules a downlink message for initial access communication and that indicates a common PUCCH resource for feedback for the downlink message. The method may include selecting a PUCCH resource from a data structure that includes a plurality of PUCCH resources for transmission in an uplink subband of an SBFD symbol (or slot). The method may include transmitting the feedback in the selected PUCCH resource.

Some aspects described herein relate to a method of wireless communication performed by a UE. The method may include receiving DCI that schedules a downlink message for initial access communication and that indicates a common PUCCH resource for feedback for the downlink message. The method may include selecting a PUCCH resource set based at least in part on a slot type. The method may include selecting a PUCCH resource based at least in part on an index within the PUCCH resource set. The method may include transmitting the feedback in a first PRB for a first frequency hop in an uplink subband of an SBFD symbol that is associated with the selected PUCCH resource and in a second PRB for a second frequency hop in the uplink subband.

Some aspects described herein relate to a UE for wireless communication. The UE may include one or more memories and one or more processors coupled to the one or more memories. The one or more processors may be individually or collectively configured to cause the UE to receive DCI that schedules a downlink message for initial access communication and that indicates a common PUCCH resource for feedback for the downlink message. The one or more processors may be individually or collectively configured to cause the UE to obtain one or more subband PRB offsets for transmitting the feedback in an uplink subband of an SBFD symbol associated with the common PUCCH resource. The one or more processors may be individually or collectively configured to cause the UE to transmit the feedback in a first PRB for a first frequency hop in the uplink subband and in a second PRB for a second frequency hop in the uplink subband, based at least in part on the one or more subband PRB offsets.

Some aspects described herein relate to a network entity for wireless communication. The network entity may include one or more memories and one or more processors coupled to the one or more memories. The one or more processors may be individually or collectively configured to cause the network entity to transmit DCI that schedules a downlink message for initial access communication and that indicates a common PUCCH resource for feedback for the downlink message. The one or more processors may be individually or collectively configured to cause the network entity to receive the feedback in a first PRB for a first frequency hop in an uplink subband of an SBFD symbol associated with the common PUCCH resource and in a second PRB for a second frequency hop in the uplink subband.

Some aspects described herein relate to a UE for wireless communication. The UE may include one or more memories and one or more processors coupled to the one or more memories. The one or more processors may be individually or collectively configured to cause the network entity to receive DCI that schedules a downlink message for initial access communication and that indicates a common PUCCH resource for feedback for the downlink message. The one or more processors may be individually or collectively configured to cause the UE to select a PUCCH resource from a data structure that includes a plurality of PUCCH resources for transmission in an uplink subband of an SBFD symbol. The one or more processors may be individually or collectively configured to cause the UE to transmit the feedback in the selected PUCCH resource.

Some aspects described herein relate to a UE for wireless communication. The UE may include one or more memories and one or more processors coupled to the one or more memories. The one or more processors may be individually or collectively configured to cause the UE to receive DCI that schedules a downlink message for initial access communication and that indicates a common PUCCH resource for feedback for the downlink message. The one or more processors may be individually or collectively configured to cause the UE to select a PUCCH resource set based at least in part on a slot type. The one or more processors may be individually or collectively configured to cause the UE to select a PUCCH resource based at least in part on an index within the PUCCH resource set. The one or more processors may be individually or collectively configured to cause the UE to transmit the feedback in a first PRB for a first frequency hop in an uplink subband of an SBFD symbol that is associated with the selected PUCCH resource and in a second PRB for a second frequency hop in the uplink subband.

Some aspects described herein relate to a non-transitory computer-readable medium that stores a set of instructions for wireless communication by a UE. The set of instructions, when executed by one or more processors of the UE, may cause the UE to receive DCI that schedules a downlink message for initial access communication and that indicates a common PUCCH resource for feedback for the downlink message. The set of instructions, when executed by one or more processors of the UE, may cause the UE to obtain one or more subband PRB offsets for transmitting the feedback in an uplink subband of an SBFD symbol associated with the common PUCCH resource. The set of instructions, when executed by one or more processors of the UE, may cause the UE to transmit the feedback in a first PRB for a first frequency hop in the uplink subband and in a second PRB for a second frequency hop in the uplink subband, based at least in part on the one or more subband PRB offsets.

Some aspects described herein relate to a non-transitory computer-readable medium that stores a set of instructions for wireless communication by a network entity. The set of instructions, when executed by one or more processors of the network entity, may cause the network entity to transmit DCI that schedules a downlink message for initial access communication and that indicates a common PUCCH resource for feedback for the downlink message. The set of instructions, when executed by one or more processors of the network entity, may cause the network entity to receive the feedback in a first PRB for a first frequency hop in an uplink subband of an SBFD symbol associated with the common PUCCH resource and in a second PRB for a second frequency hop in the uplink subband.

Some aspects described herein relate to a non-transitory computer-readable medium that stores a set of instructions for wireless communication by a UE, the one or more instructions, when executed by one or more processors of a UE, may cause the UE to receive DCI that schedules a downlink message for initial access communication and that indicates a common PUCCH resource for feedback for the downlink message. The set of instructions, when executed by the one or more processors, may cause the UE to select a PUCCH resource from a data structure that includes a plurality of PUCCH resources for transmission in an uplink subband of an SBFD symbol. The set of instructions, when executed by the one or more processors, may cause the UE to transmit the feedback in the selected PUCCH resource.

Some aspects described herein relate to a non-transitory computer-readable medium that stores a set of instructions for wireless communication, the one or more instructions, when executed by one or more processors of a UE, may cause the UE to receive DCI that schedules a downlink message for initial access communication and that indicates a common PUCCH resource for feedback for the downlink message. The set of instructions, when executed by the one or more processors, may the UE to select a PUCCH resource set based at least in part on a slot type. The set of instructions, when executed by the one or more processors, may cause the UE to select a PUCCH resource based at least in part on an index within the PUCCH resource set. The set of instructions, when executed by the one or more processors, may cause the UE to transmit the feedback in a first PRB for a first frequency hop in an uplink subband of an SBFD symbol that is associated with the selected PUCCH resource and in a second PRB for a second frequency hop in the uplink subband.

Some aspects described herein relate to an apparatus for wireless communication. The apparatus may include means for receiving DCI that schedules a downlink message for initial access communication and that indicates a common PUCCH resource for feedback for the downlink message. The apparatus may include means for obtaining one or more subband PRB offsets for transmitting the feedback in an uplink subband of an SBFD symbol associated with the common PUCCH resource. The apparatus may include means for transmitting the feedback in a first PRB for a first frequency hop in the uplink subband and in a second PRB for a second frequency hop in the uplink subband, based at least in part on the one or more subband PRB offsets.

Some aspects described herein relate to an apparatus for wireless communication. The apparatus may include means for transmitting DCI that schedules a downlink message for initial access communication and that indicates a common PUCCH resource for feedback for the downlink message. The apparatus may include means for receiving the feedback in a first PRB for a first frequency hop in an uplink subband of an SBFD symbol associated with the common PUCCH resource and in a second PRB for a second frequency hop in the uplink subband.

Some aspects described herein relate to an apparatus for wireless communication. The apparatus may include means for receiving DCI that schedules a downlink message for initial access communication and that indicates a common PUCCH resource for feedback for the downlink message. The apparatus may include means for selecting a PUCCH resource from a data structure that includes a plurality of PUCCH resources for transmission in an uplink subband of an SBFD symbol. The apparatus may include means for transmitting the feedback in the selected PUCCH resource.

Some aspects described herein relate to an apparatus for wireless communication. The apparatus may include means for receiving DCI that schedules a downlink message for initial access communication and that indicates a common PUCCH resource for feedback for the downlink message. The apparatus may include means for selecting a PUCCH resource set based at least in part on a slot type. The apparatus may include means for selecting a PUCCH resource based at least in part on an index within the PUCCH resource set. The apparatus may include means for transmitting the feedback in a first PRB for a first frequency hop in an uplink subband of an SBFD symbol that is associated with the selected PUCCH resource and in a second PRB for a second frequency hop in the uplink subband.

Aspects generally include a method, apparatus, system, computer program product, non-transitory computer-readable medium, UE, base station, network entity, wireless communication device, or processing system as substantially described with reference to and as illustrated by the drawings and specification.

The foregoing has outlined rather broadly the features and technical advantages of examples in accordance with the disclosure in order that the detailed description that follows may be better understood. Additional features and advantages will be described hereinafter. The conception and specific examples disclosed may be readily utilized as a basis for modifying or designing other structures for carrying out the same purposes of the present disclosure. Such equivalent constructions do not depart from the scope of the appended claims. Characteristics of the concepts disclosed herein, both their organization and method of operation, together with associated advantages will be better understood from the following description when considered in connection with the accompanying figures. Each of the figures is provided for the purposes of illustration and description, and not as a definition of the limits of the claims.

BRIEF DESCRIPTION OF THE DRAWINGS

So that the above-recited features of the present disclosure can be understood in detail, a more particular description, briefly summarized above, may be had by reference to aspects, some of which are illustrated in the appended drawings. It is to be noted, however, that the appended drawings illustrate only some typical aspects of this disclosure and are therefore not to be considered limiting of its scope, for the description may admit to other equally effective aspects. The same reference numbers in different drawings may identify the same or similar elements.

FIG. 4 is a diagram illustrating examples of full duplex communication, in accordance with the present disclosure.

FIG. 15 is a diagram illustrating an example process performed, for example, by a UE, in accordance with the present disclosure.

FIG. 16 is a diagram illustrating an example process performed, for example, by a network entity, in accordance with the present disclosure.

FIG. 18 is a diagram illustrating an example process performed, for example, by a UE, in accordance with the present disclosure.

DETAILED DESCRIPTION

Various aspects of the disclosure are described more fully hereinafter with reference to the accompanying drawings. This disclosure may, however, be embodied in many different forms and are not to be construed as limited to any specific structure or function presented throughout this disclosure. Rather, these aspects are provided so that this disclosure will be thorough and complete, and will fully convey the scope of the disclosure to those skilled in the art. One skilled in the art may appreciate that the scope of the disclosure is intended to cover any aspect of the disclosure disclosed herein, whether implemented independently of or combined with any other aspect of the disclosure. For example, an apparatus may be implemented or a method may be practiced using any quantity of the aspects set forth herein. In addition, the scope of the disclosure is intended to cover such an apparatus or method which is practiced using other structure, functionality, or structure and functionality in addition to or other than the various aspects of the disclosure set forth herein. Any aspect of the disclosure disclosed herein may be embodied by one or more elements of a claim.

Several aspects of telecommunication systems will now be presented with reference to various apparatuses and techniques. These apparatuses and techniques will be described in the following detailed description and illustrated in the accompanying drawings by various blocks, modules, components, circuits, steps, processes, or algorithms (collectively referred to as "elements"). These elements may be implemented using hardware, software, or a combination of hardware and software. Whether such elements are implemented as hardware or software depends upon the particular application and design constraints imposed on the overall system.

Figure 1:
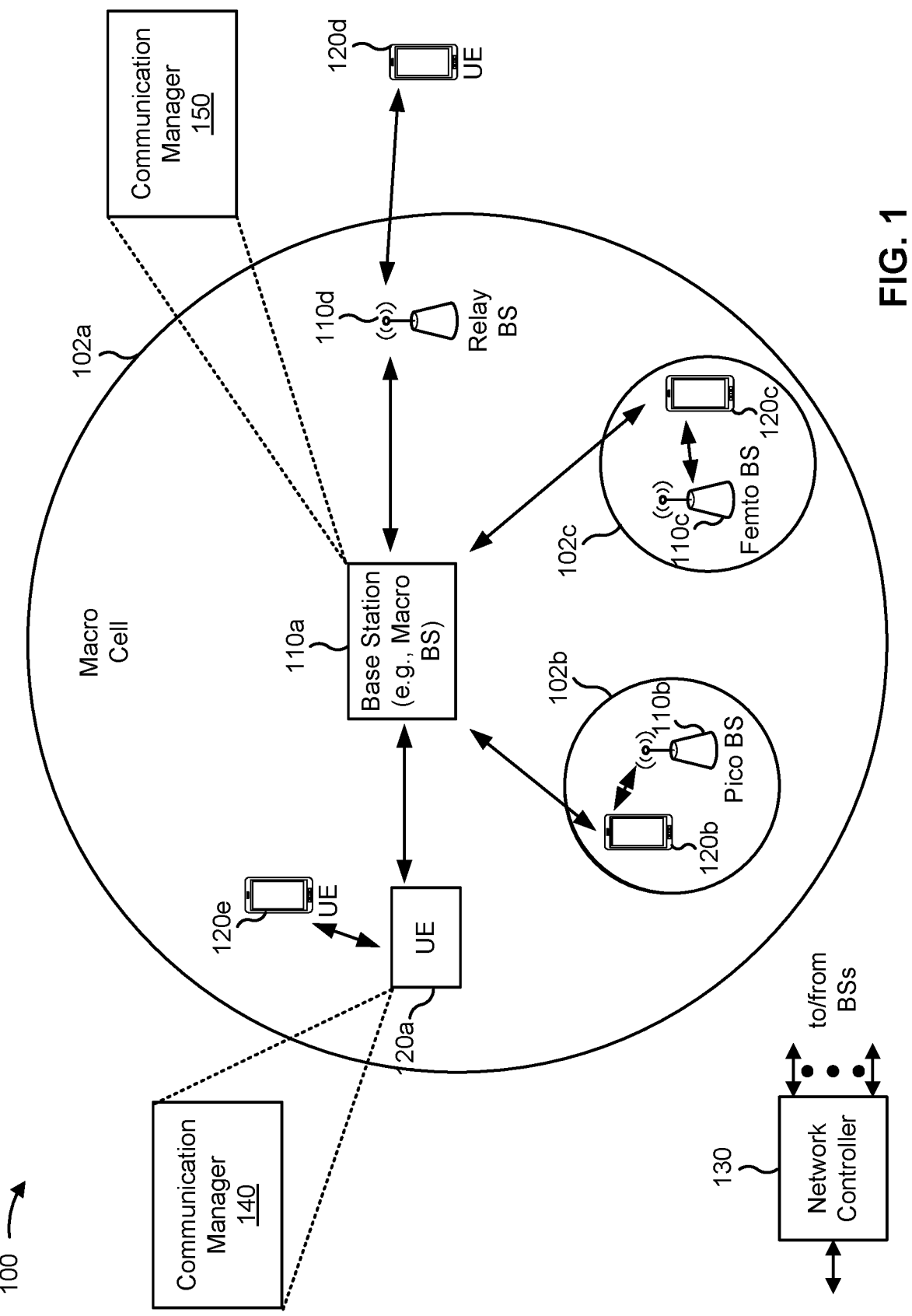
FIG. 1 is a diagram illustrating an example of a wireless network, in accordance with the present disclosure.

FIG. 1 is a diagram illustrating an example of a wireless network in accordance with the present disclosure. The wireless network 100 may be or may include elements of a 5G (e.g., NR) network or a 4G (e.g., Long Term Evolution (LTE)) network, among other examples. The wireless network 100 may include one or more base stations 110 (shown as a BS 110a, a BS 110b, a BS 110c, and a BS 110d), a user equipment (UE) 120 or multiple UEs 120 (shown as a UE 120a, a UE 120b, a UE 120c, a UE 120d, and a UE 120e), or other network entities. A base station 110 is an entity that communicates with UEs 120. A base station 110 (sometimes referred to as a BS) may include, for example, an NR base station, an LTE base station, a Node B, an eNB (e.g., in 4G), a gNB (e.g., in 5G), an access point, or a transmission reception point (TRP). Each base station 110 may provide communication coverage for a particular geographic area. In the Third Generation Partnership Project (3GPP), the term "cell" can refer to a coverage area of a base station 110 or a base station subsystem serving this coverage area, depending on the context in which the term is used.

A base station 110 may provide communication coverage for a macro cell, a pico cell, a femto cell, or another type of cell. A macro cell may cover a relatively large geographic area (e.g., several kilometers in radius) and may allow unrestricted access by UEs 120 with service subscriptions. A pico cell may cover a relatively small geographic area and may allow unrestricted access by UEs 120 with service subscription. A femto cell may cover a relatively small geographic area (e.g., a home) and may allow restricted access by UEs 120 having association with the femto cell (e.g., UEs 120 in a closed subscriber group (CSG)). A base station 110 for a macro cell may be referred to as a macro base station. A base station 110 for a pico cell may be referred to as a pico base station. A base station 110 for a femto cell may be referred to as a femto base station or an in-home base station.

The wireless network 100 may be a heterogeneous network that includes base stations 110 of different types, such as macro base stations, pico base stations, femto base stations, or relay base stations. These different types of base stations 110 may have different transmit power levels, different coverage areas, or different impacts on interference in the wireless network 100. For example, macro base stations may have a high transmit power level (e.g., 5 to 40 watts) whereas pico base stations, femto base stations, and relay base stations may have lower transmit power levels (e.g., 0.1 to 2 watts). In the example shown in FIG. 1, the BS 110a may be a macro base station for a macro cell 102a, the BS 110b may be a pico base station for a pico cell 102b, and the BS 110c may be a femto base station for a femto cell 102c. A base station may support one or multiple (e.g., three) cells. A network controller 130 may couple to or communicate with a set of base stations 110 and may provide coordination and control for these base stations 110. The network controller 130 may communicate with the base stations 110 via a backhaul communication link. The base stations 110 may communicate with one another directly or indirectly via a wireless or wireline backhaul communication link.

In some aspects, the terms "base station" (e.g., the base station 110) or "network entity" may refer to an aggregated base station, a disaggregated base station, an integrated access and backhaul (IAB) node, a relay node, or one or more components thereof. For example, in some aspects, "base station" or "network entity" may refer to a central unit (CU), a distributed unit (DU), a radio unit (RU), a Near-Real Time (Near-RT) RAN Intelligent Controller (RIC), or a Non-Real Time (Non-RT) RIC, or a combination thereof. In some aspects, the terms "base station" or "network entity" may refer to one device configured to perform one or more functions, such as those described herein in connection with the base station 110. In some aspects, the terms "base station" or "network entity" may refer to a plurality of devices configured to perform the one or more functions. For example, in some distributed systems, each of a quantity of different devices (which may be located in the same geographic location or in different geographic locations) may be configured to perform at least a portion of a function, or to duplicate performance of at least a portion of the function, and the terms "base station" or "network entity" may refer to any one or more of those different devices. In some aspects, the terms "base station" or "network entity" may refer to one or more virtual base stations or one or more virtual base station functions. For example, in some aspects, two or more base station functions may be instantiated on a single device. In some aspects, the terms "base station" or "network entity" may refer to one of the base station functions and not another. In this way, a single device may include more than one base station.

In some examples, a cell may not necessarily be stationary, and the geographic area of the cell may move in accordance with the location of a base station 110 that is mobile (e.g., a mobile base station). In some examples, the base stations 110 may be interconnected to one another or to one or more other base stations 110 or network nodes (not shown) in the wireless network 100 through various types of backhaul interfaces, such as a direct physical connection or a virtual network, using any suitable transport network.

The wireless network 100 may include one or more relay stations. A relay station is an entity that can receive a transmission of data from an upstream station (e.g., a base station 110 or a UE 120) and send a transmission of the data to a downstream station (e.g., a UE 120 or a base station 110). A relay station may be a UE 120 that can relay transmissions for other UEs 120. In the example shown in FIG. 1, the BS 110d (e.g., a relay base station) may communicate with the BS 110a (e.g., a macro base station) and the UE 120d in order to facilitate communication between the BS 110a and the UE 120d. A base station 110 that relays communications may be referred to as a relay station, a relay base station, or a relay.

The UEs 120 may be dispersed throughout the wireless network 100, and each UE 120 may be stationary or mobile. A UE 120 may include, for example, an access terminal, a terminal, a mobile station, or a subscriber unit. A UE 120 may be a cellular phone (e.g., a smart phone), a personal digital assistant (PDA), a wireless modem, a wireless communication device, a handheld device, a laptop computer, a cordless phone, a wireless local loop (WLL) station, a tablet, a camera, a gaming device, a netbook, a smartbook, an ultrabook, a medical device, a biometric device, a wearable device (e.g., a smart watch, smart clothing, smart glasses, a smart wristband, smart jewelry (e.g., a smart ring or a smart bracelet)), an entertainment device (e.g., a music device, a video device, or a satellite radio), a vehicular component or sensor, a smart meter/sensor, industrial manufacturing equipment, a global positioning system device, or any other suitable device that is configured to communicate via a wireless medium.

Some UEs 120 may be considered machine-type communication (MTC) or evolved or enhanced machine-type communication (eMTC) UEs. An MTC UE or an eMTC UE may include, for example, a robot, a drone, a remote device, a sensor, a meter, a monitor, or a location tag, that may communicate with a base station, another device (e.g., a remote device), or some other entity. Some UEs 120 may be considered Internet-of-Things (IoT) devices, or may be implemented as NB-IoT (narrowband IoT) devices. Some UEs 120 may be considered a Customer Premises Equipment. A UE 120 may be included inside a housing that houses components of the UE 120, such as processor components or memory components. In some examples, the processor components and the memory components may be coupled together. For example, the processor components (e.g., one or more processors) and the memory components (e.g., a memory) may be operatively coupled, communicatively coupled, electronically coupled, or electrically coupled.

In general, any quantity of wireless networks 100 may be deployed in a given geographic area. Each wireless network 100 may support a particular RAT and may operate on one or more frequencies. A RAT may be referred to as a radio technology or an air interface. A frequency may be referred to as a carrier or a frequency channel. Each frequency may support a single RAT in a given geographic area in order to avoid interference between wireless networks of different RATs. In some cases, NR or 5G RAT networks may be deployed.

In some examples, two or more UEs 120 (e.g., shown as UE 120*a* and UE 120*e*) may communicate directly using one or more sidelink channels (e.g., without using a base station 110 as an intermediary to communicate with one another). For example, the UEs 120 may communicate using peer-to-peer (P2P) communications, device-to-device (D2D) communications, a vehicle-to-everything (V2X) protocol (e.g., which may include a vehicle-to-vehicle (V2V) protocol, a vehicle-to-infrastructure (V2I) protocol, or a vehicle-to-pedestrian (V2P) protocol), or a mesh network. In such examples, a UE 120 may perform scheduling operations, resource selection operations, or other operations described elsewhere herein as being performed by the base station 110.

Devices of the wireless network 100 may communicate using the electromagnetic spectrum, which may be subdivided by frequency or wavelength into various classes, bands, or channels. For example, devices of the wireless network 100 may communicate using one or more operating bands. In 5G NR, two initial operating bands have been identified as frequency range designations FR1 (410 MHz- 7.125 GHz) and FR2 (24.25 GHz-52.6 GHz). It should be understood that although a portion of FR1 is greater than 6 GHz, FR1 is often referred to (interchangeably) as a "Sub-6 GHz" band in various documents and articles. A similar nomenclature issue sometimes occurs in connection with FR2, which is often referred to (interchangeably) as a "millimeter wave" band in documents and articles, despite being different from the extremely high frequency (EHF) band (30 GHz-300 GHz) which is identified by the International Telecommunications Union (ITU) as a "millimeter wave" band.

The frequencies between FR1 and FR2 are often referred to as mid-band frequencies. Recent 5G NR studies have identified an operating band for these mid-band frequencies as frequency range designation FR3 (7.125 GHz-24.25 GHz). Frequency bands falling within FR3 may inherit FR1 characteristics or FR2 characteristics, and thus may effectively extend features of FR1 or FR2 into mid-band frequencies. In addition, higher frequency bands are currently being explored to extend 5G NR operation beyond 52.6 GHz. For example, three higher operating bands have been identified as frequency range designations FR4a or FR4-1 (52.6 GHz-71 GHz), FR4 (52.6 GHz-114.25 GHz), and FR5 (114.25 GHz-300 GHz). Each of these higher frequency bands falls within the EHF band.

With the above examples in mind, unless specifically stated otherwise, it should be understood that the term "sub-6 GHz," if used herein, may broadly represent frequencies that may be less than 6 GHz, may be within FR1, or may include mid-band frequencies. Further, unless specifically stated otherwise, it should be understood that the term "millimeter wave," if used herein, may broadly represent frequencies that may include mid-band frequencies, may be within FR2, FR4, FR4-a or FR4-1, or FR5, or may be within the EHF band. It is contemplated that the frequencies included in these operating bands (e.g., FR1, FR2, FR3, FR4, FR4-a, FR4-1, or FR5) may be modified, and techniques described herein are applicable to those modified frequency ranges.

In some aspects, a UE (e.g., UE 120) may include a communication manager 140. As described in more detail elsewhere herein, the communication manager 140 may receive downlink control information (DCI) that schedules a downlink message for initial access communication and that indicates a common physical uplink control channel (PUCCH) resource for feedback for the downlink message. The communication manager 140 may obtain one or more subband physical resource block (PRB) offsets for transmitting the feedback in an uplink subband of a subband full duplex (SBFD) symbol associated with the common PUCCH resource. The communication manager 140 may transmit the feedback in a first PRB for a first frequency hop in the uplink subband and in a second PRB for a second frequency hop in the uplink subband, based at least in part on the one or more subband PRB offsets.

In some aspects, the communication manager 140 may receive DCI that schedules a downlink message for initial access communication and that indicates a common PUCCH resource for feedback for the downlink message. The communication manager 140 may select a PUCCH resource from a data structure that includes a plurality of PUCCH resources for transmission in an uplink subband of an SBFD symbol. The communication manager 140 may transmit the feedback in the selected PUCCH resource.

In some aspects, the communication manager 140 may receive DCI that schedules a downlink message for initial access communication and that indicates a common PUCCH resource for feedback for the downlink message. The communication manager 140 may select a PUCCH resource set based at least in part on a slot type. The communication manager 140 may select a PUCCH resource based at least in part on an index within the PUCCH resource set. The communication manager 140 may transmit the feedback in a first PRB for a first frequency hop in an uplink subband of an SBFD symbol that is associated with the selected PUCCH resource and in a second PRB for a second frequency hop in the uplink subband. Additionally, or alternatively, the communication manager 140 may perform one or more other operations described herein.

In some aspects, a network entity (e.g., base station 110) may include a communication manager 150. As described in more detail elsewhere herein, the communication manager 150 may transmit DCI that schedules a downlink message for initial access communication and that indicates a common PUCCH resource for feedback for the downlink message. The communication manager 150 may receive the feedback in a first PRB for a first frequency hop in an uplink subband of an SBFD symbol associated with the common PUCCH resource and in a second PRB for a second frequency hop in the uplink subband. Additionally, or alternatively, the communication manager 150 may perform one or more other operations described herein.

As indicated above, FIG. 1 is provided as an example. Other examples may differ from what is described with regard to FIG. 1.

Figure 2:
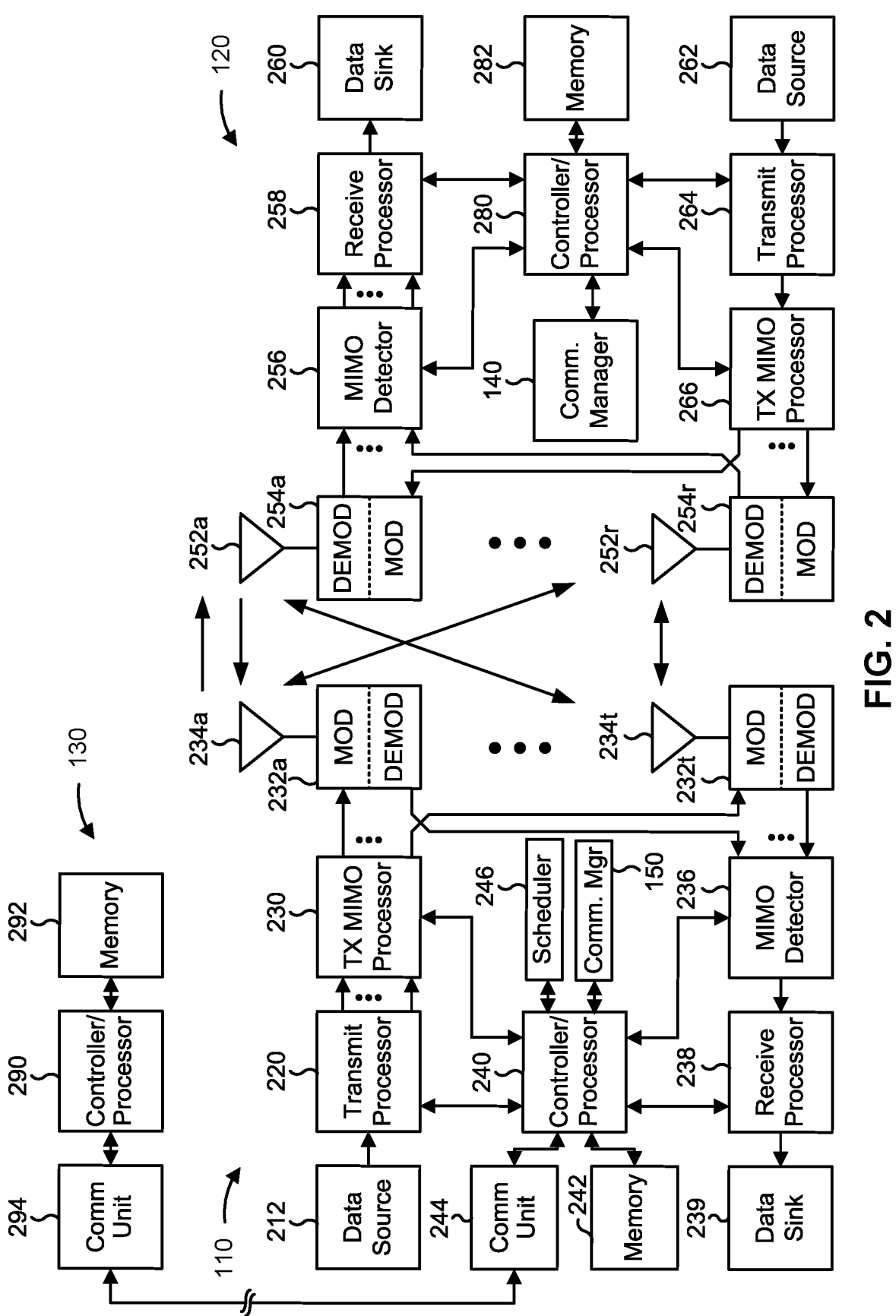
FIG. 2 is a diagram illustrating an example base station in communication with a user equipment (UE) in a wireless network, in accordance with the present disclosure.

FIG. 2 is a diagram illustrating an example base station 110 in communication with a UE 120 in a wireless network in accordance with the present disclosure. The base station 110 may correspond to the base station 110 of FIG. 1. Similarly, the UE 120 may correspond to the UE 120 of FIG. 1. The base station 110 may be equipped with a set of antennas 234a through 234t, such as T antennas (T≥1). The UE 120 may be equipped with a set of antennas 252a through 252r, such as R antennas (R≥1).

At the base station 110, a transmit processor 220 may receive data, from a data source 212, intended for the UE 120 (or a set of UEs 120). The transmit processor 220 may select one or more modulation and coding schemes (MCSs) for the UE 120 based at least in part on one or more channel quality indicators (CQIs) received from that UE 120. The base station 110 may process (e.g., encode and modulate) the data for the UE 120 based at least in part on the MCS(s) selected for the UE 120 and may provide data symbols for the UE 120. The transmit processor 220 may process system information (e.g., for semi-static resource partitioning information (SRPI)) and control information (e.g., CQI requests, grants, or upper layer signaling) and provide overhead symbols and control symbols. The transmit processor 220 may generate reference symbols for reference signals (e.g., a cell-specific reference signal (CRS) or a demodulation reference signal (DMRS)) and synchronization signals (e.g., a primary synchronization signal (PSS) or a secondary synchronization signal (SSS)). A transmit (TX) multiple-input multiple-output (MIMO) processor 230 may perform spatial processing (e.g., precoding) on the data symbols, the control symbols, the overhead symbols, or the reference symbols, if applicable, and may provide a set of output symbol streams (e.g., T output symbol streams) to a corresponding set of modems 232 (e.g., T modems), shown as modems 232a through 232t. For example, each output symbol stream may be provided to a modulator component (shown as MOD) of a modem 232. Each modem 232 may use a respective modulator component to process a respective output symbol stream (e.g., for OFDM) to obtain an output sample stream. Each modem 232 may further use a respective modulator component to process (e.g., convert to analog, amplify, filter, or upconvert) the output sample stream to obtain a downlink signal. The modems 232a through 232t may transmit a set of downlink signals (e.g., T downlink signals) via a corresponding set of antennas 234 (e.g., T antennas), shown as antennas 234a through 234t.

At the UE 120, a set of antennas 252 (shown as antennas 252a through 252r) may receive the downlink signals from the base station 110 or other base stations 110 and may provide a set of received signals (e.g., R received signals) to a set of modems 254 (e.g., R modems), shown as modems 254a through 254r. For example, each received signal may be provided to a demodulator component (shown as DEMOD) of a modem 254. Each modem 254 may use a respective demodulator component to condition (e.g., filter, amplify, downconvert, or digitize) a received signal to obtain input samples. Each modem 254 may use a demodulator component to further process the input samples (e.g., for OFDM) to obtain received symbols. A MIMO detector 256 may obtain received symbols from the modems 254, may perform MIMO detection on the received symbols if applicable, and may provide detected symbols. A receive processor 258 may process (e.g., demodulate and decode) the detected symbols, may provide decoded data for the UE 120 to a data sink 260, and may provide decoded control information and system information to a controller/processor 280. The term "controller/processor" may refer to one or more controllers, one or more processors, or a combination thereof. A channel processor may determine a reference signal received power (RSRP) parameter, a received signal strength indicator (RSSI) parameter, a reference signal received quality (RSRQ) parameter, or a CQI parameter, among other examples. In some examples, one or more components of the UE 120 may be included in a housing.

The network controller 130 may include a communication unit 294, a controller/processor 290, and a memory 292. The network controller 130 may include, for example, one or more devices in a core network. The network controller 130 may communicate with the base station 110 via the communication unit 294.

One or more antennas (e.g., antennas 234a through 234t or antennas 252a through 252r) may include, or may be included within, one or more antenna panels, one or more antenna groups, one or more sets of antenna elements, or one or more antenna arrays, among other examples. An antenna panel, an antenna group, a set of antenna elements, or an antenna array may include one or more antenna elements (within a single housing or multiple housings), a set of coplanar antenna elements, a set of non-coplanar antenna elements, or one or more antenna elements coupled to one or more transmission or reception components, such as one or more components of FIG. 2.

On the uplink, at the UE 120, a transmit processor 264 may receive and process data from a data source 262 and control information (e.g., for reports that include RSRP, RSSI, RSRQ, or CQI) from the controller/processor 280. The transmit processor 264 may generate reference symbols for one or more reference signals. The symbols from the transmit processor 264 may be precoded by a TX MIMO processor 266 if applicable, further processed by the modems 254 (e.g., for DFT-s-OFDM or CP-OFDM), and transmitted to the base station 110. In some examples, the modem 254 of the UE 120 may include a modulator and a demodulator. In some examples, the UE 120 includes a transceiver. The transceiver may include any combination of the antenna(s) 252, the modem(s) 254, the MIMO detector 256, the receive processor 258, the transmit processor 264, or the TX MIMO processor 266. The transceiver may be used by a processor (e.g., the controller/processor 280) and the memory 282 to perform aspects of any of the methods described herein.

At the base station 110, the uplink signals from UE 120 or other UEs may be received by the antennas 234, processed by the modem 232 (e.g., a demodulator component, shown as DEMOD, of the modem 232), detected by a MIMO detector 236 if applicable, and further processed by a receive processor 238 to obtain decoded data and control information sent by the UE 120. The receive processor 238 may provide the decoded data to a data sink 239 and provide the decoded control information to the controller/processor 240. The base station 110 may include a communication unit 244 and may communicate with the network controller 130 via the communication unit 244. The base station 110 may include a scheduler 246 to schedule one or more UEs 120 for downlink or uplink communications. In some examples, the modem 232 of the base station 110 may include a modulator and a demodulator. In some examples, the base station 110 includes a transceiver. The transceiver may include any combination of the antenna(s) 234, the modem(s) 232, the MIMO detector 236, the receive processor 238, the transmit processor 220, or the TX MIMO processor 230. The transceiver may be used by a processor (e.g., the controller/processor 240) and the memory 242 to perform aspects of any of the methods described herein.

The controller/processor of a network entity (e.g., controller/processor 240 of the base station 110), the controller/processor 280 of the UE 120, or any other component(s) of FIG. 2 may perform one or more techniques associated with PRB offsets for an uplink subband of an SBFD symbol, as described in more detail elsewhere herein. For example, the controller/processor 240 of the base station 110, the controller/processor 280 of the UE 120, or any other component(s) of FIG. 2 may perform or direct operations of, for example, process 1500 of FIG. 15, process 1600 of FIG. 16, process 1700 of FIG. 17, process 1800 of FIG. 18, or other processes as described herein. The memory 242 and the memory 282 may store data and program codes for the base station 110 and the UE 120, respectively. In some examples, the memory 242 or the memory 282 may include a non-transitory computer-readable medium storing one or more instructions (e.g., code or program code) for wireless communication. For example, the one or more instructions, when executed (e.g., directly, or after compiling, converting, or interpreting) by one or more processors of the base station 110 or the UE 120, may cause the one or more processors, the UE 120, or the base station 110 to perform or direct operations of, for example, process 1500 of FIG. 15, process 1600 of FIG. 16, process 1700 of FIG. 17, process 1800 of FIG. 18, or other processes as described herein. In some examples, executing instructions may include running the instructions, converting the instructions, compiling the instructions, or interpreting the instructions, among other examples.

In some aspects, a UE (e.g., UE 120) includes means for receiving DCI that schedules a downlink message for initial access communication and that indicates a common PUCCH resource for feedback for the downlink message; means for obtaining one or more subband PRB offsets for transmitting the feedback in an uplink subband of an SBFD symbol associated with the common PUCCH resource; and/or means for transmitting the feedback in a first PRB for a first frequency hop in the uplink subband and in a second PRB for a second frequency hop in the uplink subband, based at least in part on the one or more subband PRB offsets. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, the UE includes means for receiving DCI that schedules a downlink message for initial access communication and that indicates a common PUCCH resource for feedback for the downlink message; means for selecting a PUCCH resource from a data structure that includes a plurality of PUCCH resources for transmission in an uplink subband of an SBFD symbol; and/or means for transmitting the feedback in the selected PUCCH resource.

In some aspects, the UE includes means for receiving DCI that schedules a downlink message for initial access communication and that indicates a common PUCCH resource for feedback for the downlink message; means for selecting a PUCCH resource set based at least in part on a slot type; means for selecting a PUCCH resource based at least in part on an index within the PUCCH resource set; and/or means for transmitting the feedback in a first PRB for a first frequency hop in an uplink subband of an SBFD symbol that is associated with the selected PUCCH resource and in a second PRB for a second frequency hop in the uplink subband. The means for the UE to perform operations described herein may include, for example, one or more of communication manager 140, antenna 252, modem 254, MIMO detector 256, receive processor 258, transmit processor 264, TX MIMO processor 266, controller/processor 280, or memory 282.

In some aspects, a network entity (e.g., base station 110) includes means for transmitting DCI that schedules a downlink message for initial access communication and that indicates a common PUCCH resource for feedback for the downlink message; and/or means for receiving the feedback in a first PRB for a first frequency hop in an uplink subband of an SBFD symbol associated with the common PUCCH resource and in a second PRB for a second frequency hop in the uplink subband. In some aspects, the means for the network entity to perform operations described herein may include, for example, one or more of communication manager 150, transmit processor 220, TX MIMO processor 230, modem 232, antenna 234, MIMO detector 236, receive processor 238, controller/processor 240, memory 242, or scheduler 246.

Deployment of communication systems, such as 5G NR systems, may be arranged in multiple manners with various components or constituent parts. In a 5G NR system, or network, a network node, a network entity, a mobility element of a network, a RAN node, a core network node, a network element, a base station, or a network equipment may be implemented in an aggregated or disaggregated architecture. For example, a base station (such as a Node B (NB), an evolved NB (eNB), an NR BS, a 5G NB, an access point (AP), a TRP, or a cell, among other examples), or one or more units (or one or more components) performing base station functionality, may be implemented as an aggregated base station (also known as a standalone base station or a monolithic base station) or a disaggregated base station.

An aggregated base station may be configured to utilize a radio protocol stack that is physically or logically integrated within a single RAN node (e.g., within a single device or unit). A disaggregated base station may be configured to utilize a protocol stack that is physically or logically distributed among two or more units (such as a CU, one or more DUs, or one or more RUs). In some examples, a CU may be implemented within a RAN node, and one or more DUs may be co-located with the CU, or alternatively, may be geographically or virtually distributed throughout one or multiple other RAN nodes. The DUs may be implemented to communicate with one or more RUs. Each of the CU, DU, and RU also can be implemented as virtual units, such as a virtual central unit (VCU), a virtual distributed unit (VDU), or a virtual radio unit (VRU), among other examples.

Base station-type operation or network design may consider aggregation characteristics of base station functionality. For example, disaggregated base stations may be utilized in an IAB network, an open radio access network (O-RAN (such as the network configuration sponsored by the O-RAN Alliance)), or a virtualized radio access network (vRAN, also known as a cloud radio access network (C-RAN)) to facilitate scaling of communication systems by separating base station functionality into one or more units that can be individually deployed. A disaggregated base station may include functionality implemented across two or more units at various physical locations, as well as functionality implemented for at least one unit virtually, which can enable flexibility in network design. The various units of the disaggregated base station can be configured for wired or wireless communication with at least one other unit of the disaggregated base station.

In some aspects, an individual processor may perform all of the functions described as being performed by the one or more processors. In some aspects, one or more processors may collectively perform a set of functions. For example, a first set of (one or more) processors of the one or more processors may perform a first function described as being performed by the one or more processors, and a second set of (one or more) processors of the one or more processors may perform a second function described as being performed by the one or more processors. The first set of processors and the second set of processors may be the same set of processors or may be different sets of processors. Reference to "one or more processors" should be understood to refer to any one or more of the processors described in connection with FIG. 2. Reference to "one or more memories" should be understood to refer to any one or more memories of a corresponding device, such as the memory described in connection with FIG. 2. For example, functions described as being performed by one or more memories can be performed by the same subset of the one or more memories or different subsets of the one or more memories.

While blocks in FIG. 2 are illustrated as distinct components, the functions described above with respect to the blocks may be implemented in a single hardware, software, or combination component or in various combinations of components. For example, the functions described with respect to the transmit processor 264, the receive processor 258, and/or the TX MIMO processor 266 may be performed by or under the control of the controller/processor 280.

As indicated above, FIG. 2 is provided as an example. Other examples may differ from what is described with regard to FIG. 2.

Figure 3:
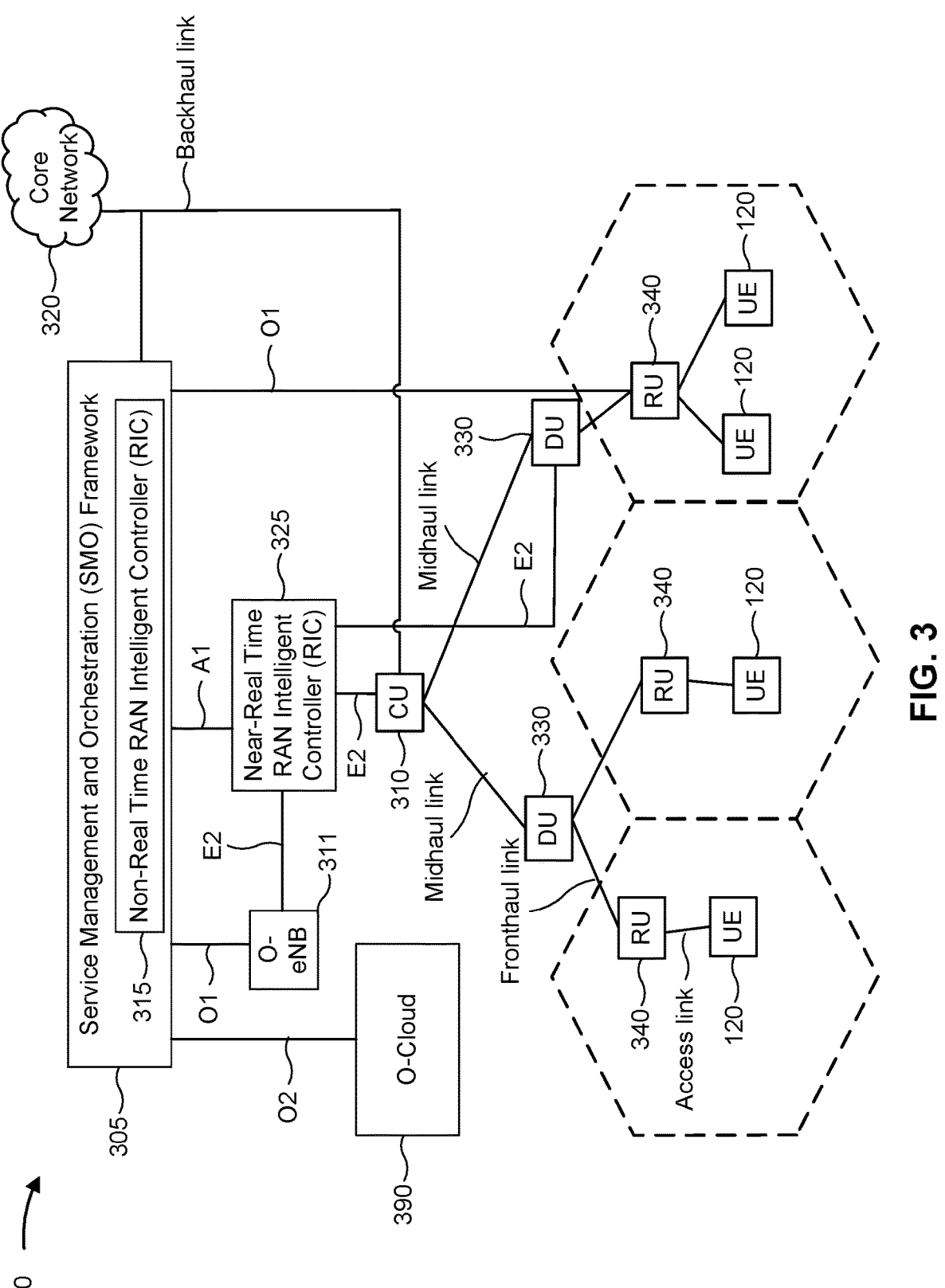
FIG. 3 is a diagram illustrating an example disaggregated base station architecture, in accordance with the present disclosure.

FIG. 3 is a diagram illustrating an example disaggregated base station architecture 300, in accordance with the present disclosure. The disaggregated base station architecture 300 may include a CU 310 that can communicate directly with a core network 320 via a backhaul link, or indirectly with the core network 320 through one or more disaggregated control units (such as a Near-RT RIC 325 via an E2 link, or a Non-RT RIC 315 associated with a Service Management and Orchestration (SMO) Framework 305, or both). A CU 310 may communicate with one or more DUs 330 via respective midhaul links, such as through F1 interfaces. Each of the DUs 330 may communicate with one or more RUs 340 via respective fronthaul links. Each of the RUs 340 may communicate with one or more UEs 120 via respective radio frequency (RF) access links. In some implementations, a UE 120 may be simultaneously served by multiple RUs 340.

Each of the units, including the CUs 310, the DUs 330, the RUs 340, as well as the Near-RT RICs 325, the Non-RT RICs 315, and the SMO Framework 305, may include one or more interfaces or be coupled with one or more interfaces configured to receive or transmit signals, data, or information (collectively, signals) via a wired or wireless transmission medium. Each of the units, or an associated processor or controller providing instructions to one or multiple communication interfaces of the respective unit, can be configured to communicate with one or more of the other units via the transmission medium. In some examples, each of the units can include a wired interface, configured to receive or transmit signals over a wired transmission medium to one or more of the other units, and a wireless interface, which may include a receiver, a transmitter or transceiver (such as a RF transceiver), configured to receive or transmit signals, or both, over a wireless transmission medium to one or more of the other units.

In some aspects, the CU 310 may host one or more higher layer control functions. Such control functions can include radio resource control (RRC) functions, packet data convergence protocol (PDCP) functions, or service data adaptation protocol (SDAP) functions, among other examples. Each control function can be implemented with an interface configured to communicate signals with other control functions hosted by the CU 310. The CU 310 may be configured to handle user plane functionality (e.g., Central Unit-User Plane (CU-UP) functionality), control plane functionality (e.g., Central Unit-Control Plane (CU-CP) functionality), or a combination thereof. In some implementations, the CU 310 can be logically split into one or more CU-UP units and one or more CU-CP units. A CU-UP unit can communicate bidirectionally with a CU-CP unit via an interface, such as the E1 interface when implemented in an O-RAN configuration. The CU 310 can be implemented to communicate with a DU 330, as necessary, for network control and signaling.

Each DU 330 may correspond to a logical unit that includes one or more base station functions to control the operation of one or more RUs 340. In some aspects, the DU 330 may host one or more of a radio link control (RLC) layer, a MAC layer, and one or more high physical (PHY) layers depending, at least in part, on a functional split, such as a functional split defined by the 3GPP. In some aspects, the one or more high PHY layers may be implemented by one or more modules for forward error correction (FEC) encoding and decoding, scrambling, and modulation and demodulation, among other examples. In some aspects, the DU 330 may further host one or more low PHY layers, such as implemented by one or more modules for a fast Fourier transform (FFT), an inverse FFT (iFFT), digital beamforming, or physical random access channel (PRACH) extraction and filtering, among other examples. Each layer (which may also be referred to as a module) can be implemented with an interface configured to communicate signals with other layers (and modules) hosted by the DU 330, or with the control functions hosted by the CU 310.

Each RU 340 may implement lower-layer functionality. In some deployments, an RU 340, controlled by a DU 330, may correspond to a logical node that hosts RF processing functions or low-PHY layer functions, such as performing an FFT, performing an iFFT, digital beamforming, or PRACH extraction and filtering, among other examples, based at least in part on a functional split (e.g., a functional split defined by the 3GPP), such as a lower layer functional split. In such an architecture, each RU 340 can be operated to handle over the air (OTA) communication with one or more UEs 120. In some implementations, real-time and non-real-time aspects of control and user plane communication with the RU(s) 340 can be controlled by the corresponding DU 330. In some scenarios, this configuration can enable each DU 330 and the CU 310 to be implemented in a cloud-based RAN architecture, such as a vRAN architecture.

The SMO Framework 305 may be configured to support RAN deployment and provisioning of non-virtualized and virtualized network elements. For non-virtualized network elements, the SMO Framework 305 may be configured to support the deployment of dedicated physical resources for RAN coverage requirements, which may be managed via an operations and maintenance interface (such as an O1 interface). For virtualized network elements, the SMO Framework 305 may be configured to interact with a cloud computing platform (such as an open cloud (O-Cloud) platform 390) to perform network element life cycle management (such as to instantiate virtualized network elements) via a cloud computing platform interface (such as an O2 interface). Such virtualized network elements can include, but are not limited to, CUs 310, DUs 330, RUs 340, non-RT RICs 315, and Near-RT RICs 325. In some implementations, the SMO Framework 305 can communicate with a hardware aspect of a 4G RAN, such as an open eNB (O-eNB) 311, via an O1 interface. Additionally, in some implementations, the SMO Framework 305 can communicate directly with each of one or more RUs 340 via a respective O1 interface. The SMO Framework 305 also may include a Non-RT RIC 315 configured to support functionality of the SMO Framework 305.

The Non-RT RIC 315 may be configured to include a logical function that enables non-real-time control and optimization of RAN elements and resources, Artificial Intelligence/Machine Learning (AI/ML) workflows including model training and updates, or policy-based guidance of applications/features in the Near-RT RIC 325. The Non-RT RIC 315 may be coupled to or communicate with (such as via an A1 interface) the Near-RT RIC 325. The Near-RT RIC 325 may be configured to include a logical function that enables near-real-time control and optimization of RAN elements and resources via data collection and actions over an interface (such as via an E2 interface) connecting one or more CUs 310, one or more DUs 330, or both, as well as an O-eNB, with the Near-RT RIC 325.

In some implementations, to generate AI/ML models to be deployed in the Near-RT RIC 325, the Non-RT RIC 315 may receive parameters or external enrichment information from external servers. Such information may be utilized by the Near-RT RIC 325 and may be received at the SMO Framework 305 or the Non-RT RIC 315 from non-network data sources or from network functions. In some examples, the Non-RT RIC 315 or the Near-RT RIC 325 may be configured to tune RAN behavior or performance. For example, the Non-RT RIC 315 may monitor long-term trends and patterns for performance and employ AI/ML models to perform corrective actions through the SMO Framework

305 (such as reconfiguration via an O1 interface) or via creation of RAN management policies (such as A1 interface policies).

As indicated above, FIG. 3 is provided as an example. Other examples may differ from what is described with regard to FIG. 3.

FIG. 4 is a diagram illustrating examples of full duplex communication 400, in accordance with the present disclosure. In some cases, a wireless communication device (such as a UE or a network entity) may support full duplex operations. Full duplex operations may include the wireless communication device transmitting and receiving at approximately the same time.

A UE may operate in an in-band full duplex (FD) mode. In the in-band full duplex mode, the UE may transmit and receive on a same time and frequency resource. An uplink and a downlink may share the same time and frequency resource. For example, in a first full duplex communication 402, a time and frequency resource for the uplink may fully overlap with a time and frequency resource for the downlink. As another example, in a second full duplex communication 404, a time and frequency resource for the uplink may partially overlap with a time and frequency resource for the downlink.

Full duplex operations may include SBFD mode. The SBFD mode may also be referred to as a subband frequency division duplex mode or a flexible duplex mode. SBFD communication 406 shows that the wireless communication device may transmit and receive at a same time (in the same SBFD slot), but the wireless communication device may transmit and receive on different frequency domain resources. For example, a network entity may be operating in an SBFD mode. The network entity may schedule a first UE to receive a downlink communication in an SBFD slot. The network entity may schedule a second UE to transmit an uplink communication in the same SBFD slot. However, the uplink communication may cause interference for the first UE that is receiving the downlink communication. To address this, a downlink time/frequency resource in the SBFD slot may be separated (e.g., in time or frequency) from an uplink time/frequency resource in the SBFD slot by a gap, which may function to reduce self-interference and improve latency and uplink coverage. The gap may be a frequency offset or a frequency gap (guard band) between downlink time/frequency resources and uplink time/frequency resources in the same SBFD slot.

In some cases, a slot pattern may include a combination of downlink slots, uplink slots, or SBFD slots.

As indicated above, FIG. 4 is provided as an example. Other examples may differ from what is described with regard to FIG. 4.

Figure 5:
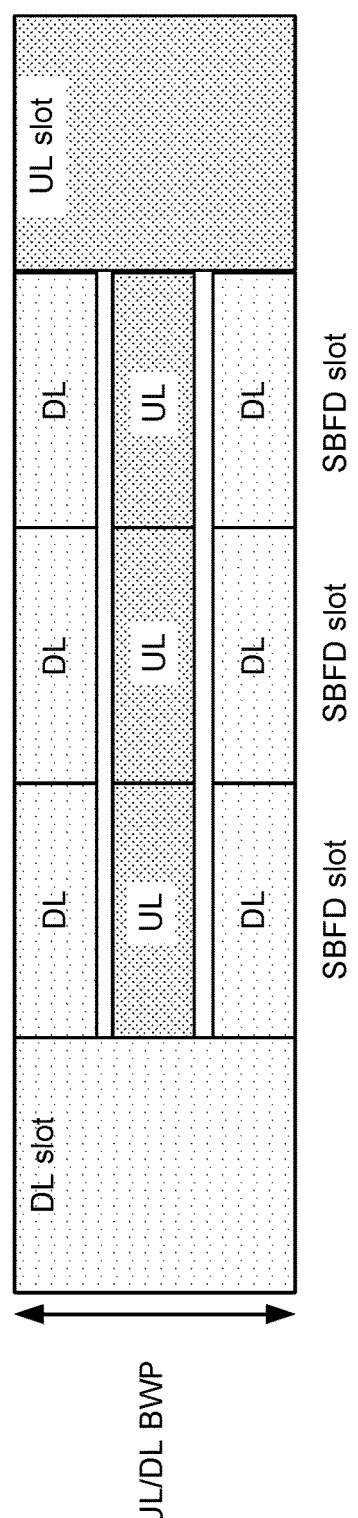
FIG. 5 is a diagram illustrating an example of a slot pattern with subband full duplex (SBFD) slots, in accordance with the present disclosure.

FIG. 5 is a diagram illustrating an example 500 of a slot pattern with SBFD slots, in accordance with the present disclosure.

A UE may transmit or receive communications using a configured slot pattern. The configured slot pattern may include a combination of downlink slots, uplink slots, or SBFD slots within a bandwidth part (BWP) for uplink (UL) and downlink (DL). Example 500 shows SBFD slots (SBFD symbols in SBFD slots) that may be used for operation in a radio resource control (RRC) connected state, where the UE maintains a connection that is established with RRC signaling. The time and frequency locations of subbands for SBFD operation may not be known to UEs. In some examples, the UE may be an SBFD-aware UE, where the time and frequency locations of subbands for SBFD operation are known to the SBFD-aware UE.

As indicated above, FIG. 5 is provided as an example. Other examples may differ from what is described with regard to FIG. 5.

Figure 6:
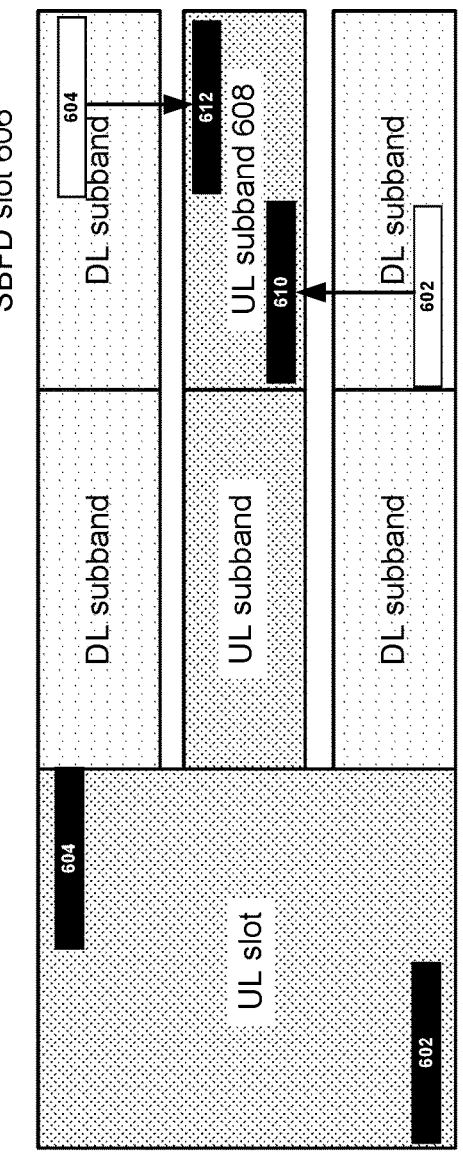
FIG. 6 is a diagram illustrating an example of communications in an uplink subband of an SBFD symbol, in accordance with the present disclosure.

FIG. 6 is a diagram illustrating an example 600 of communications in an uplink subband of an SBFD slot, in accordance with the present disclosure.

A UE may transmit communications in uplink resources, such as an uplink slot or an uplink subband in an SBFD slot. For example, the UE may receive downlink control information in a physical downlink control channel (PDCCH) communication, where the DCI (e.g., DCI format 1_0) schedules a physical downlink shared channel (PDSCH) communication (e.g., Msg4). The UE may transmit feedback for the PDSCH communication, such as a hybrid automatic repeat request (HARQ) acknowledgement (ACK) or a negative acknowledgement (NACK). The UE may transmit the feedback in a PUCCH resource. The PUCCH resource may be a cell-specific PUCCH resource. The UE may extract cell-specific configuration (e.g., PUCCH-ConfigCommon) from a system information block (SIB), such as a SIB1. There are 16 PUCCH resources and the UE may determine a PUCCH resource with index $$r_{PUCCH} \quad 0 \le r_{PUCCH} \le 15 \quad r_{PUCCH} = \left\lfloor \frac{2 \, n_{CCE,0}}{N_{CCE}} \right\rfloor + 2 \times \Delta_{PRI},$$

where $N_{CCE}$ is a number of command control elements (CCEs) in a control resource set (CORESET) of a PDCCH reception with the DCI format, $n_{CCE,0}$ is the index of a first CCE for the PDCCH reception, and $\Delta_{PRI}$ is a physical resource indicator (PRI) value of the PUCCH resource indicator field in the DCI format (e.g., 3 bits). For example, an index of 0 may indicate a PUCCH format of 0, a first symbol at symbol 12, a quantity of symbols of 2, a PRB offset of 0, a set of initial channel state (CS) indices of {0, 3}, and a PRB allocation of 8, while an index of 10, for example, may indicate a PUCCH format of 1, a first symbol at symbol 4, a quantity of symbols of 10, a PRB offset of 4, a set of initial CS indices of {0, 3, 6, 9}, and a PRB allocation of 4.

PUCCH resources may involve frequency hopping. For example, for intra-slot frequency hopping, where a first communication (e.g., first half of symbols) in a slot is in a first PRB within an UL BWP of a component carrier (CC) and a second communication (e.g., second half of symbols) in the slot is in a second PRB within the UL BWP, where the second PRB is at a different frequency than the first PRB (a frequency hop).

As indicated above, FIG. 5 is provided as an example. Other examples may differ from what is described with regard to FIG. 5.

FIG. 6 is a diagram illustrating an example 600 of PRBs in an UL subband, in accordance with the present disclosure.

A network entity and a UE that is configured to use SBFD slots (SBFD-aware UE) may utilize, during initial access in an initial UL BWP, an uplink subband for a PUCCH transmission carrying feedback. The feedback may include ACK/NACK (A/N) feedback for a downlink (DL) message (e.g., Msg4). The UE may apply frequency hopping for the PUCCH transmission prior to receiving any dedicated UE configuration (except for the case of shared spectrum or unlicensed spectrum where the UE is configured with an interlacing pattern). As shown by example 600, the UE may transmit feedback (first half) in a first PRB 602 of an UL slot and hop frequencies to transmit the feedback (second half)

in a second PRB 604. PRB 602 and PRB 604 are within a full BWP and may be considered a first BWP PRB and a second BWP PRB, respectively. PRB 602 may be considered to be RB 0 and PRB 604 may be a highest RB.

However, an issue arises when a PUCCH resource is triggered for an uplink subband in an SBFD slot. For example, an SBFD slot 606 may include an UL subband 608 between DL subbands. PRB 602 and PRB 604, used for frequency hopping, are not located within the frequency band (RBs) of UL subband 608. That is, PRB 602 is not in a PRB (e.g., PRB 610) that is within the UL subband 608, and PRB 604 is also not within a PRB (e.g., PRB 612) that is within the UL subband 608. As a result, the feedback may fail to be transmitted in a PUCCH resource, which can degrade communications and waste power, processing resources, and signaling resources.

As indicated above, FIG. 6 is provided as an example. Other examples may differ from what is described with regard to FIG. 6.

Figure 7:
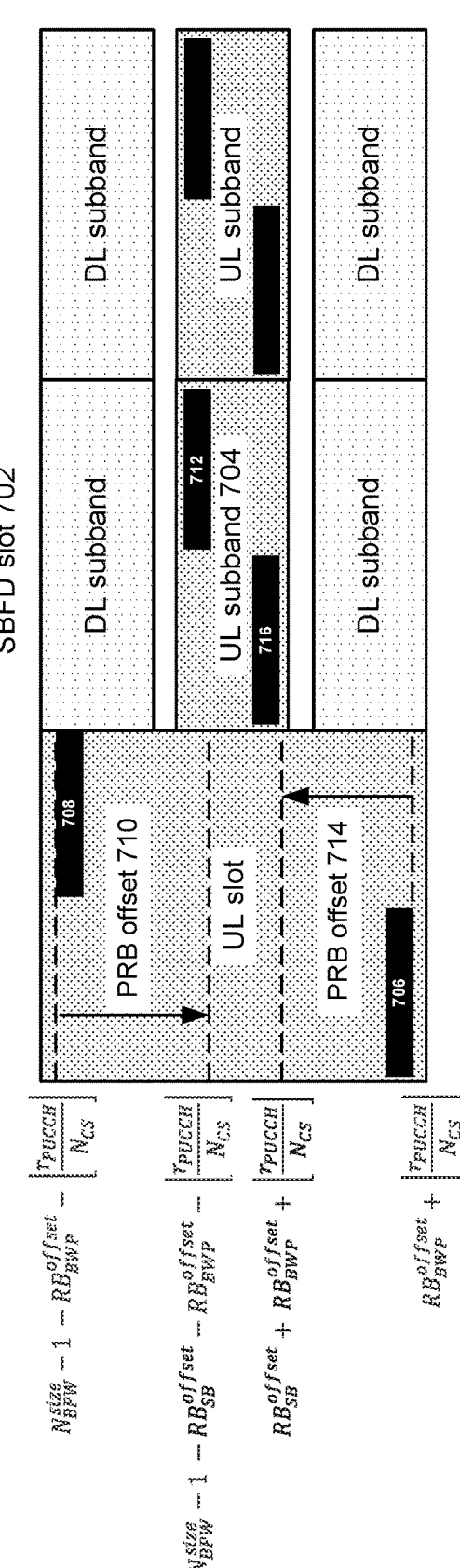
FIG. 7 is a diagram illustrating an example of PRB offsets for use with an UL subband, in accordance with the present disclosure.

FIG. 7 is a diagram illustrating an example 700 of PRB offsets for use with an UL subband, in accordance with the present disclosure.

According to various aspects described herein, a UE may be configured with PRB offsets (PRB subband offsets) for use with a subband in an SBFD slot. One or more PRB offsets may be used with intra-slot frequency hopping. Example 700 shows an SBFD slot 702 with an UL subband 704. PRB 706 and PRB 708 are within a BWP but outside UL subband 704, or outside the frequency range (RBs) of UL subband 704. Example 700 shows that a UE may be configured to use PRB offset 710 from PRB 708 in order to transmit feedback in PRB 712 (PRB 708 minus PRB offset 710). Similarly, the UE may be configured to use PRB offset 714 from PRB 706 in order to transmit feedback in PRB 716 (PRB 706 plus PRB offset 714). Example 700 shows a symmetric operation of PRB offsets for UL subband 704, where PRB offset 710 and PRB offset 714 are the same.

Example 700 shows formulas for determining PRBs, such as for PRB 706, PRB 708, PRB 712, and PRB 716 within slots used for PUCCH transmission. PRB offset 710 and/or PRB offset 714 may be represented by $$RB_{SB}^{offset}.$$

If $$\left\lfloor \frac{r_{PUCCH}}{8} \right\rfloor = 0,$$

the UE may determine the lowest PRB index (for PRB 716) of the PUCCH transmission in the first hop as $$RB_{SB}^{offset} \times N_{RB} + RB_{BWP}^{offset} \times N_{RB} + \left\lfloor \frac{r_{PUCCH}}{N_{CS}} \right\rfloor \times N_{RB}$$

and the lowest PRB index (for PRB 716) of the PUCCH transmission in the second hop as $$N_{BPW}^{size} - N_{RB} - RB_{SB}^{offset} \times N_{RB} -$$

-continued $$RB_{BWP}^{offset} \times N_{RB} - \left\lfloor \frac{r_{PUCCH}}{N_{CS}} \right\rfloor \times N_{RB}. \text{ If } \left\lfloor \frac{r_{PUCCH}}{8} \right\rfloor = 1,$$

the UE may determine the lowest PRB index (for PRB 716) of the PUCCH transmission in the first hop as $$N_{BPW}^{size} - N_{RB} - RB_{SB}^{offset} \times N_{RB} - RB_{BWP}^{offset} \times N_{RB} - \left\lfloor \frac{r_{PUCCH}}{N_{CS}} \right\rfloor \times N_{RB}$$

and the lowest PRB index (for PRB 712) of the PUCCH transmission in the second hop as $$RB_{SB}^{offset} \times N_{RB} + RB_{BWP}^{offset} \times N_{RB} + \left\lfloor \frac{r_{PUCCH}}{N_{CS}} \right\rfloor \times N_{RB}.$$

Note the UE may not apply the value of $$RB_{SB}^{offset}$$

for PUCCH transmission in the UL slots, and each PUCCH resource (including PRBs for PUCCH transmission) may be configured with specific (e.g., different) values of for a PRB offset.

In some aspects, a PRB offset may be explicitly configured, such as via a broadcast configuration or via an uplink subband configuration. In some aspects, the UE may implicitly determine the PRB offset. For example, the PRB offset may represent the first RB in the UL subband with respect to a common RB 0. In another example, the PRB offset may represent the first RB in the UL subband with respect to the first RB of the initial UL BWP.

By using configured PRB offsets for use with an UL subband in an SBFD slot, the UE may successfully transmit feedback in a PUCCH resource. This may improve communications and conserve power, processing resources, and signaling resources.

As indicated above, FIG. 7 is provided as an example. Other examples may differ from what is described with regard to FIG. 7.

Figure 8:
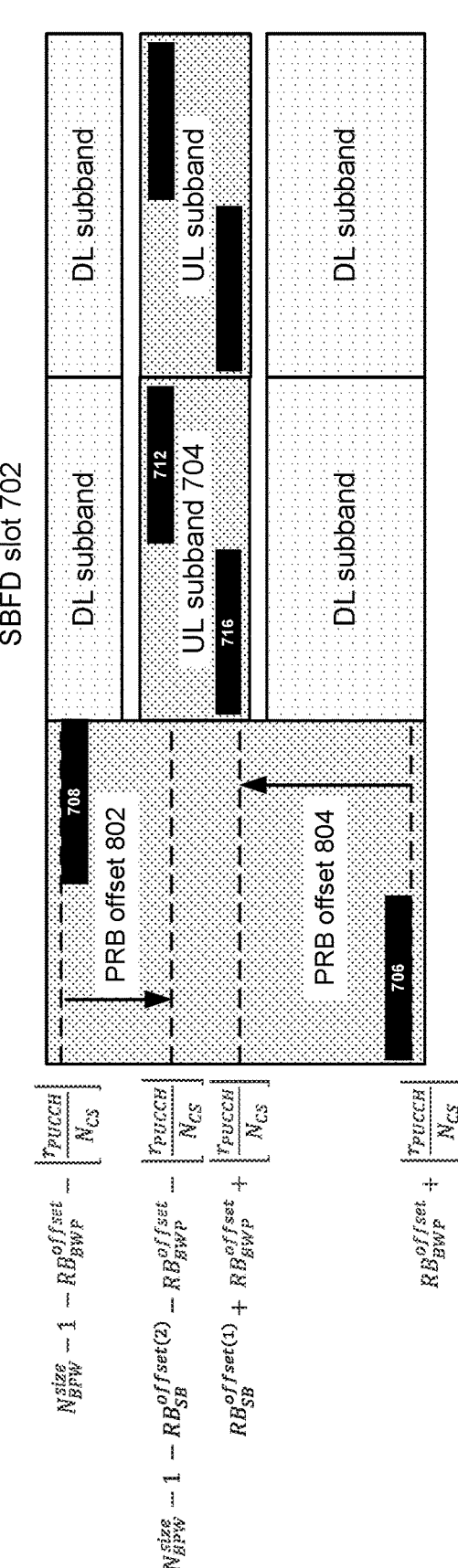
FIG. 8 is a diagram illustrating an example of PRB offsets for use with an UL subband, in accordance with the present disclosure.

FIG. 8 is a diagram illustrating an example 800 of PRB offsets for use with an UL subband, in accordance with the present disclosure.

In some aspects, the UE may be configured with PRB offsets that are different. Example 800 shows two SBFD-specific PRB offsets $$\left( RB_{SB}^{offset(1)} \text{ and } RB_{SB}^{offset(2)} \right)$$

for transmitting in a PUCCH resource within an UL subband. PRB offset 802 is less than PRB offset 804. This may be applicable in scenarios where the UL subband is not centered at the middle of the slot (e.g., configured at the side). A symmetric (mirror image) will not be applicable within the UL subband. If $$\left\lfloor \frac{r_{PUCCH}}{8} \right\rfloor = 0,$$

the UE may determine the lowest PRB index (for PRB 716) of the PUCCH transmission in the first hop as $$RB_{SB}^{offset(1)} \times N_{RB} + RB_{BWP}^{offset} \times N_{RB} + \left\lfloor \frac{r_{PUCCH}}{N_{CS}} \right\rfloor \times N_{RB}$$

and the lowest PRB index (for PRB 712) of the PUCCH transmission in the second hop as $$N_{BPW}^{size} - N_{RB} - RB_{SB}^{offset(2)} \times N_{RB} -$$
$$RB_{BWP}^{offset} \times N_{RB} - \left\lfloor \frac{r_{PUCCH}}{N_{CS}} \right\rfloor \times N_{RB}. \text{ If } \left\lfloor \frac{r_{PUCCH}}{8} \right\rfloor = 1,$$

the UE may determine the lowest PRB index (for PRB 716) of the PUCCH transmission in the first hop as $$N_{BPW}^{size} - N_{RB} - RB_{SB}^{offset(2)} \times N_{RB} - RB_{BWP}^{offset} \times N_{RB} - \left\lfloor \frac{r_{PUCCH}}{N_{CS}} \right\rfloor \times N_{RB}$$

and the lowest PRB index (for PRB 712) of the PUCCH transmission in the second hop as $$RB_{SB}^{offset(1)} \times N_{RB} + RB_{BWP}^{offset} \times N_{RB} + \left\lfloor \frac{r_{PUCCH}}{N_{CS}} \right\rfloor \times N_{RB}.$$

Note that the UE may not apply the value of $$RB_{SB}^{offsets}$$

for PUCCH transmission in the UL slots, and each PUCCH resource may be configured (or determined) with specific (e.g., different) value for a PRB offset.

In some aspects, the PRB offsets may be explicitly configured via broadcast configuration or via an UL subband configuration. In some aspects, the UE may implicitly determine the PRB offsets. For example, PRB offset 804 for PRB 716 may be determined with respect to a common RB 0. In another example, PRB offset 804 for PRB 716 may be determined in the UL subband 704 with respect to PRB 706 of the initial UL BWP. PRB offset 802 may be determined in the UL subband 704 with respect to the common RB 0. PRB offset 802 for PRB 712 may also be determined with respect to PRB 706 or PRB 708 of the initial UL BWP.

As indicated above, FIG. 8 is provided as an example. Other examples may differ from what is described with regard to FIG. 8.

Figure 9:
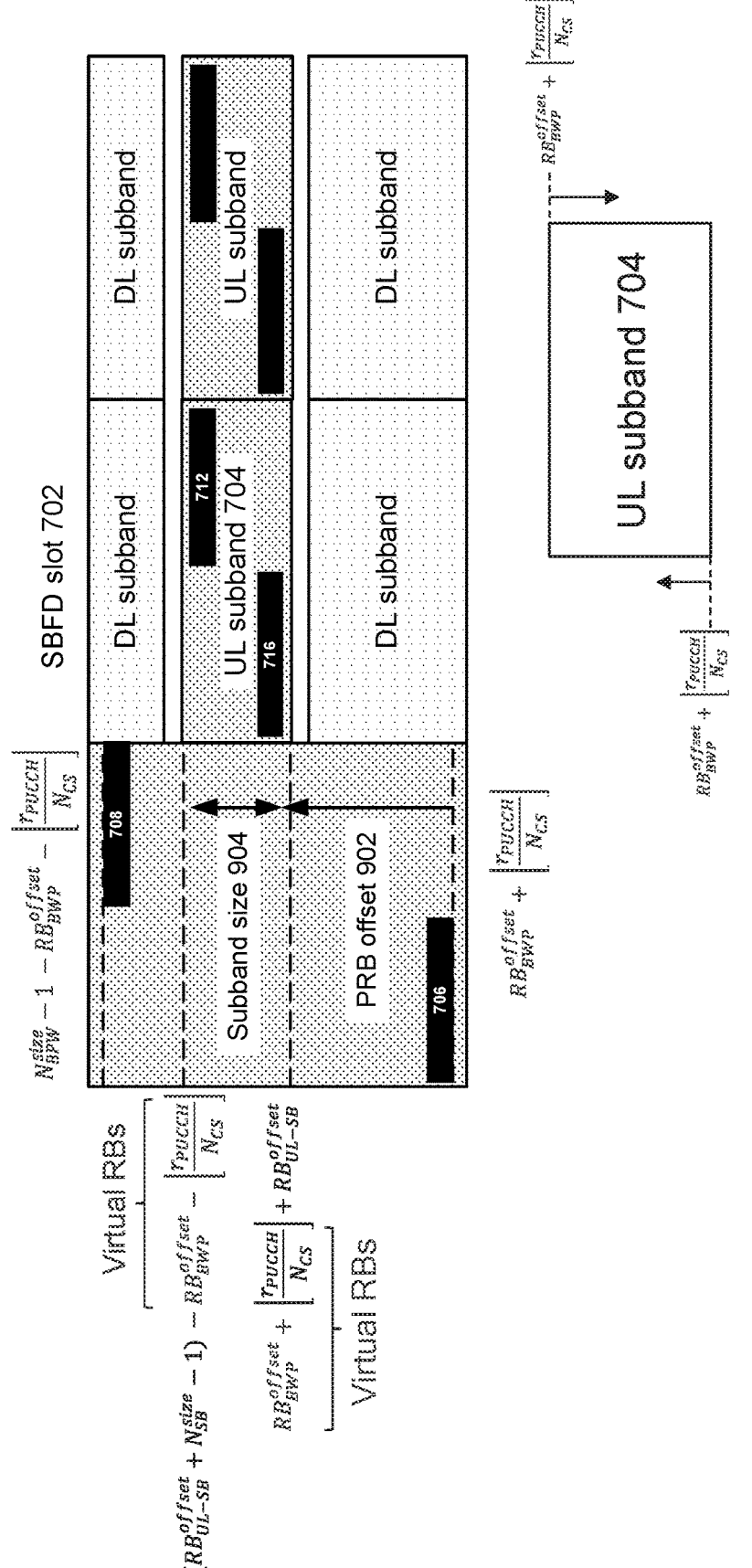
FIG. 9 is a diagram illustrating an example of PRB offsets for use with an UL subband, in accordance with the present disclosure.

FIG. 9 is a diagram illustrating an example 900 of PRB offsets for use with an UL subband, in accordance with the present disclosure.

In some aspects, the PRBs within an UL subband may be based at least in part on a single PRB offset 902 and a size 904 of the UL subband. This may involve minor frequency hopping with respect to the UL subband. For example, the UE may use, for a first frequency hop, the PRB offset 902 to map to a first PRB (PRB 716) in the UL subband 704. The UE may use, for a second frequency hop, a mirror RB offset that is based at least in part on the PRB offset 902 and the UL subband size 904. This may include using PRB offset 902 for PRB 716 and PRB offset 902 plus the UL subband size 904 for PRB 712, or PRB 716 plus the UL subband size 904.

As indicated above, FIG. 9 is provided as an example. Other examples may differ from what is described with regard to FIG. 9.

Figure 10:
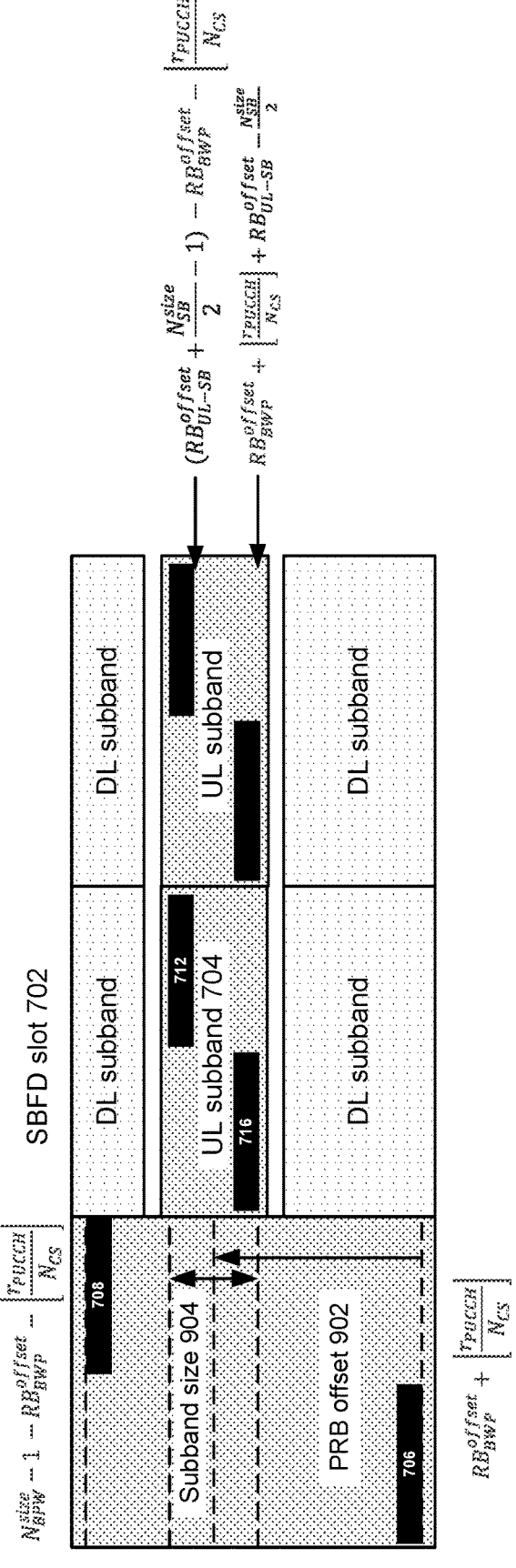
FIG. 10 is a diagram illustrating an example of PRB offsets for use with an UL subband, in accordance with the present disclosure.

FIG. 10 is a diagram illustrating an example 1000 of PRB offsets for use with an UL subband, in accordance with the present disclosure.

In some aspects, the UE may use an SBFD-specific RB offset that maps to the middle of the UL subband 704. For example, a PRB offset 902 may be from PRB 706 to a center of the UL subband 704. PRB 716 and PRB 712 may mirror each other across the center of the UL subband 704. For example, PRB 716 may be the PRB offset 902 from PRB 706 minus a portion (e.g., half) of the UL subband size 904, and PRB 712 may be the PRB offset 902 plus the portion of the UL subband size 904.

As indicated above, FIG. 10 is provided as an example. Other examples may differ from what is described with regard to FIG. 10.

Figure 11:
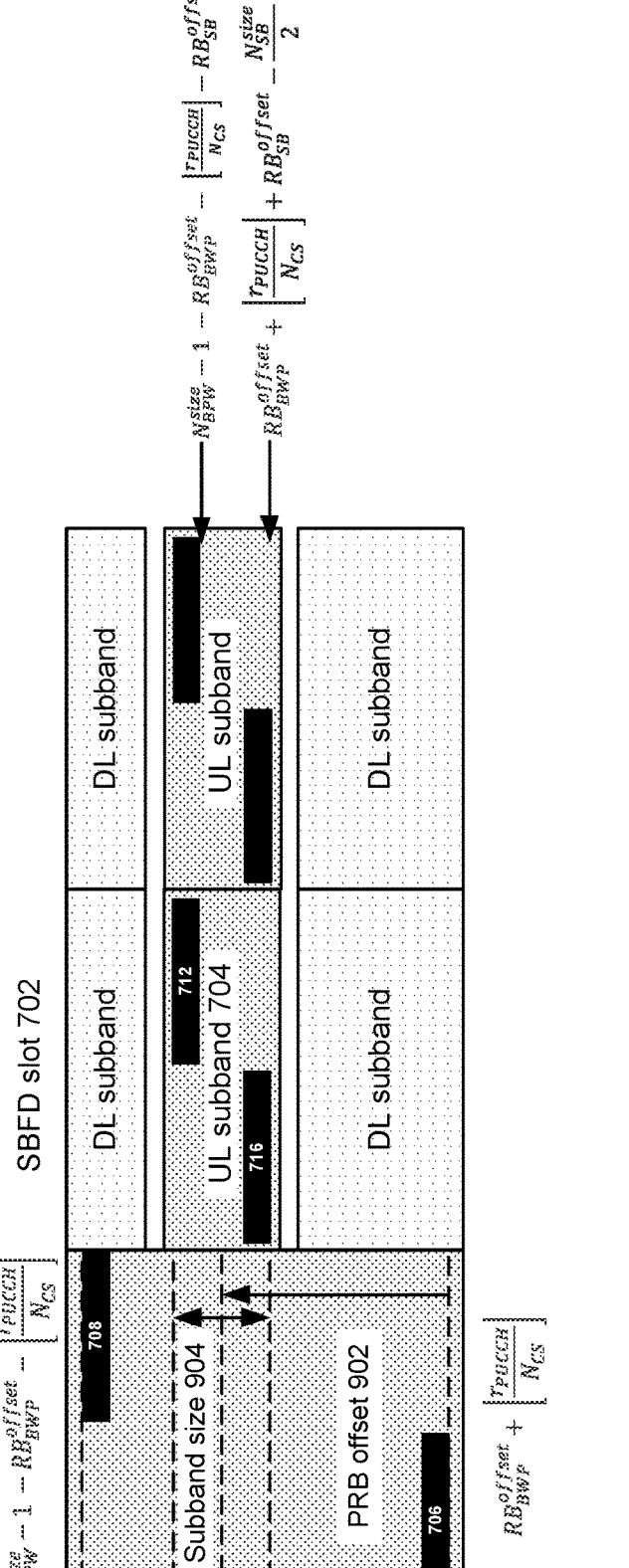
FIG. 11 is a diagram illustrating an example of PRB offsets for use with an UL subband, in accordance with the present disclosure.

FIG. 11 is a diagram illustrating an example 1100 of PRB offsets for use with an UL subband, in accordance with the present disclosure.

Example 1100 shows another use of SBFD-specific PRB offsets that are configured for use with an UL subband. Instead of $$\left( RB_{UL-SB}^{offset} + \frac{N_{SB}^{size}}{2} - 1 \right) - R_{BWP}^{offset} - \left\lfloor \frac{r_{PUCCH}}{N_{CS}} \right\rfloor$$

for PRB 712 (as shown in example 1000), PRB 712 is located based at least in part on $$N_{BPW}^{size} - 1 - RB_{BWP}^{offset} - \left\lfloor \frac{r_{PUCCH}}{N_{CS}} \right\rfloor - RB_{SB}^{offset} + \frac{N_{SB}^{size}}{2}.$$

As indicated above, FIG. 11 is provided as an example. Other examples may differ from what is described with regard to FIG. 11.

Figure 12:
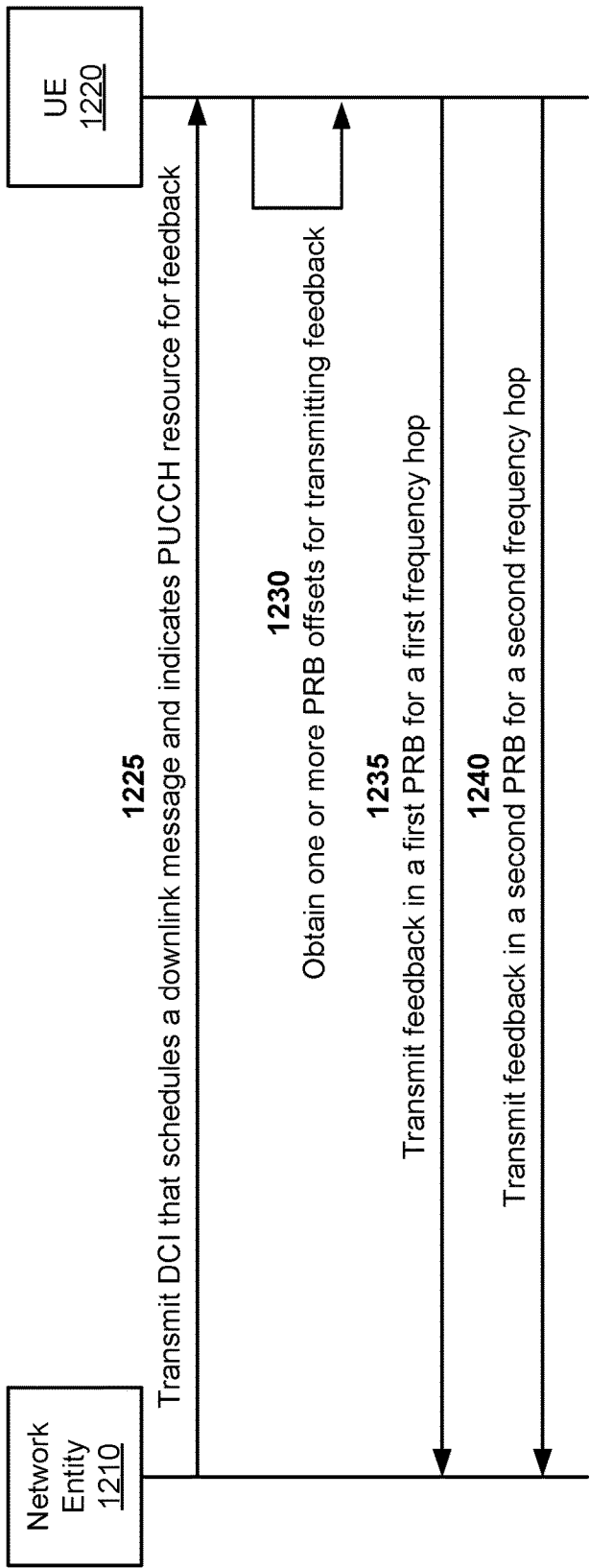
FIG. 12 is a diagram of an example associated with using PRB offsets for an UL subband, in accordance with the present disclosure.

FIG. 12 is a diagram of an example 1200 associated with using PRB offsets for an UL subband, in accordance with the present disclosure. As shown in FIG. 12, a network entity 1210 (e.g., a base station 110) may communicate with a UE 1220 (e.g., a UE 120). In some aspects, the network entity 1210 and the UE 1220 may be part of a wireless network (e.g., the wireless network 100).

As shown by reference number 1225, the network entity 1210 may transmit DCI that schedules a downlink message (e.g., PDSCH communication) for initial access communication and that indicates a common PUCCH resource for feedback for the downlink message. As shown by reference number 1230, the UE 1220 may obtain one or more subband PRB offsets for transmitting the feedback in an UL subband of an SBFD slot (for one or more SBFD symbols in the SBFD slot) associated with the common PUCCH resource. The UE 1220 may obtain the one or more subband PRB offsets by receiving an indication of the one or more subband PRB offsets or by implicitly determining the one or more subband PRB offsets.

The UE 1220 may transmit the feedback in a first PRB for a first frequency hop in the UL subband and in a second PRB for a second frequency hop in the uplink subband, based at least in part on the one or more subband PRB offsets. As shown by reference number 1235, the UE 1220 may transmit the feedback (e.g., first half) in the first PRB for the first frequency hop. As shown by reference number 1240, the UE 1220 may transmit the feedback (e.g., second half) in the second PRB for the second frequency hop.

As indicated above, FIG. 12 is provided as an example. Other examples may differ from what is described with regard to FIG. 12.

Figure 13:
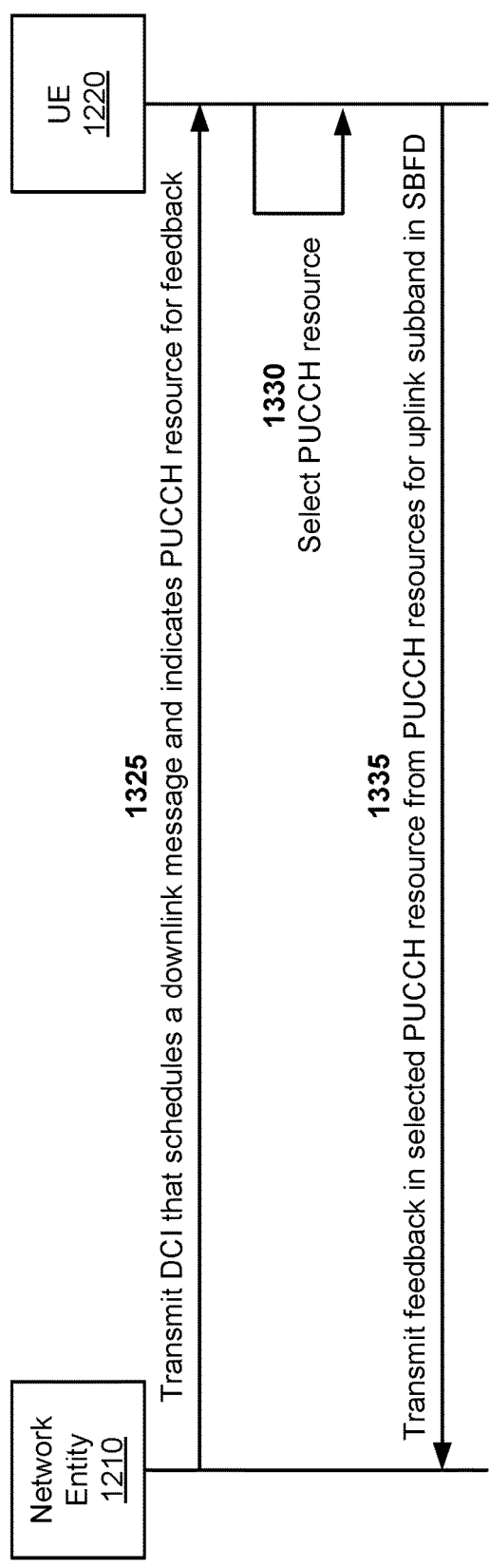
FIG. 13 is a diagram of an example associated with using PRB offsets for an UL subband, in accordance with the present disclosure.

FIG. 13 is a diagram of an example 1300 associated with using PRB offsets for an UL subband, in accordance with the present disclosure.

In some aspects, the network entity 1210 may extend the quantity of PUCCH resources from 16 resources to 32 resources. The extra 16 PUCCH resources may be for PUCCH transmission in the UL subband. The network entity 1210 may configure the UE 1220 with PRB offsets that map to the PRBs in the UL subband. This enables optimized configurations (e.g. PUCCH format, quantity of RBs, lengths) for PUCCH in an UL subband.

For example, the UE 1220 may determine the index (i.e., 5 bits) of the PUCCH resource index based at least in part on the following: 3 bits based on $\Delta_{PRI}$ (value of the PUCCH resource indicator field in the DCI format 3 bits), 1 bit based on a CCE index, and/or 1 bit based on a target slot for PUCCH transmission. The PUCCH resource may be based at least in part on a slot type, such as 1 (legacy) or 2 for SBFD, where $n_{CCE,0}$ ranges from 0 to ($N_{CCE}$−1), and $\Delta_{PRI}$ ranges from 0 to 7. Resource $r_{PUCCH}$ may be $$(SlotType - 1) \times 16 + \left\lfloor \frac{2\ n_{CCE,0}}{N_{CCE}} \right\rfloor + 2 \times \Delta_{PRI},$$

where SlotType−1 may be 0 or 16, $$\left\lfloor \frac{2\ n_{CCE,0}}{N_{CCE}} \right\rfloor$$

may be 0 or 1, 2, and $\Delta_{PRI}$ may be 0, 2, 4, 6, 8, 10, 12, or 14.

Example 1300 provides an example of using an extended quantity of PUCCH resources for an UL subband. As shown by reference number 1325, the network entity 1210 may transmit DCI that schedules a downlink message for initial access communication and that indicates a common PUCCH resource for feedback for the downlink message. As shown by reference number 1330, the UE 1220 may select a PUCCH resource from a data structure that includes a plurality of PUCCH resources for transmission in an UL subband of an SBFD symbol. As shown by reference number 1335, the UE 1220 may transmit the feedback in the selected PUCCH resource, selected from PUCCH resources for the UL subband.

By selecting from PUCCH resources specific to an UL subband in an SBFD slot, the UE may successfully transmit feedback in a PUCCH resource. This may improve communications and conserve power, processing resources, and signaling resources.

As indicated above, FIG. 13 is provided as an example. Other examples may differ from what is described with regard to FIG. 13.

Figure 14:
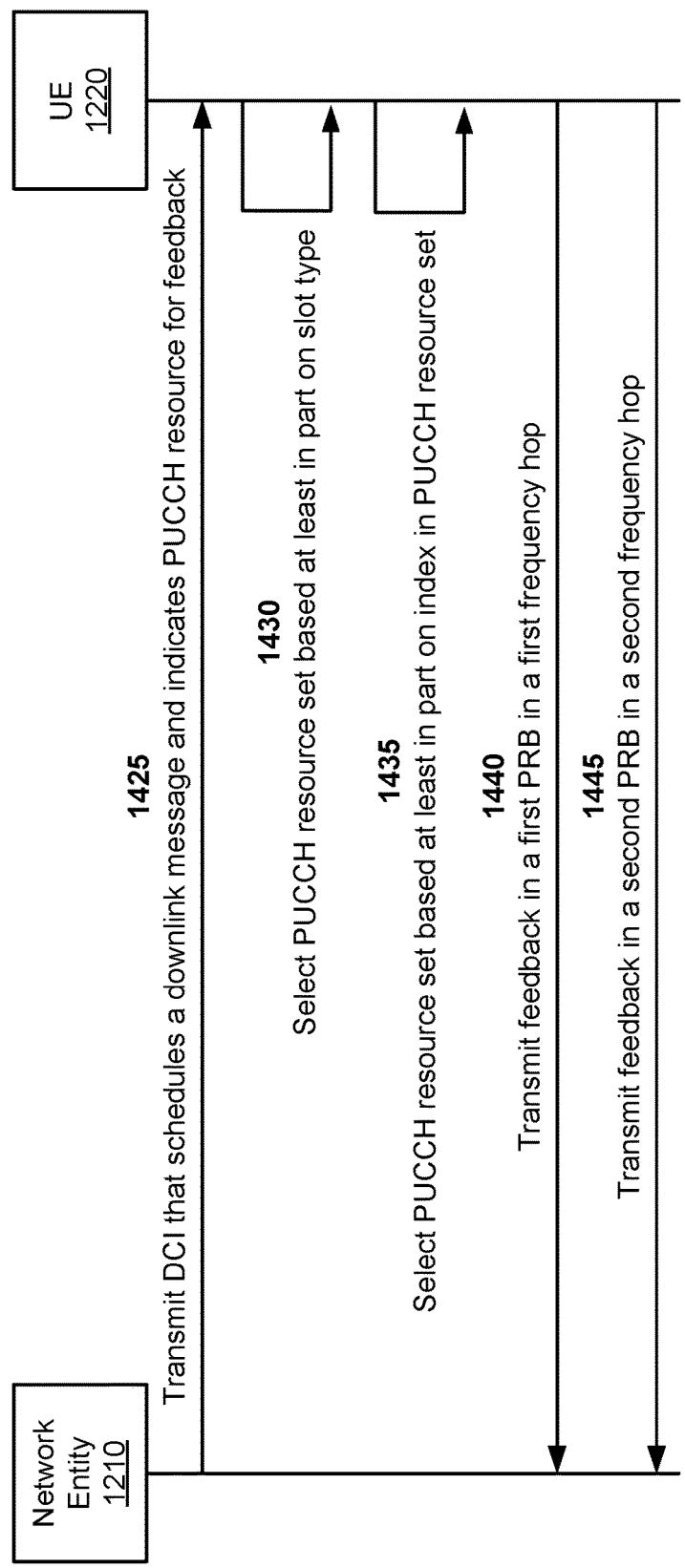
FIG. 14 is a diagram of an example associated with using an UL subband, in accordance with the present disclosure.

FIG. 14 is a diagram of an example 1400 associated with using an UL subband, in accordance with the present disclosure.

Instead of extending the number of PUCCH resources to 32 resources, the extra 16 resources may be configured with a SBFD-specific set of common PUCCH resources. There may be a first set of 16 of PUCCH resources and a second set of 16. For example, $n_{CCE,0}$ may range from 0 to ($N_{CCE}-1$), $\Delta_{PRI}$ may range from 0 to 7, and $$r_{PUCCH} = \left\lfloor \frac{2\, n_{CCE,0}}{N_{CCE}} \right\rfloor + 2 \times \Delta_{PRI}, \left\lfloor \frac{2\, n_{CCE,0}}{N_{CCE}} \right\rfloor$$

may be 0, 1, or 2. In some aspects, $\Delta_{PRI}$ may be 0, 2, 4, 6, 8, 10, 12, or 14.

Using a SBFD-specific set of PUCCH resources enables frequency hopping with PRB offsets and PRB allocations specifically for SBFD. This may enable different power control configurations (e.g., for p0).

As shown by reference number 1425, the network entity 1210 may transmit DCI that schedules a downlink message for initial access communication and that indicates a common PUCCH resource for feedback for the downlink message. As shown by reference number 1430, the UE 1220 may select a PUCCH resource set based at least in part on a slot type. As shown by reference number 1435, the UE 1220 may select a PUCCH resource based at least in part on an index within the PUCCH resource set.

The UE 1220 may transmit the feedback in a first PRB for a first frequency hop in the UL subband and in a second PRB for a second frequency hop in the uplink subband, based at least in part on the one or more subband PRB offsets. As shown by reference number 1440, the UE 1220 may transmit the feedback (e.g., first half) in the first PRB for the first frequency hop. As shown by reference number 1445, the UE 1220 may transmit the feedback (e.g., second half) in the second PRB for the second frequency hop.

As indicated above, FIG. 14 is provided as an example. Other examples may differ from what is described with regard to FIG. 14.

FIG. 15 is a diagram illustrating an example process 1500 performed, for example, by a UE, in accordance with the present disclosure. Example process 1500 is an example where the UE (e.g., UE 120, UE 1220) performs operations associated with transmitting in PRBs in an uplink band of an SBFD symbol.

As shown in FIG. 15, in some aspects, process 1500 may include receiving DCI that schedules a downlink message for initial access communication and that indicates a common PUCCH resource for feedback for the downlink message (block 1510). For example, the UE (e.g., using communication manager 1908 and/or reception component 1902 depicted in FIG. 19) may receive DCI that schedules a downlink message for initial access communication and that indicates a common PUCCH resource for feedback for the downlink message, as described above in connection with FIGS. 4-14.

As further shown in FIG. 15, in some aspects, process 1500 may include obtaining one or more subband PRB offsets for transmitting the feedback in an uplink subband of an SBFD symbol associated with the common PUCCH resource (block 1520). For example, the UE (e.g., using communication manager 1908, resource component 1910, and/or reception component 1902 depicted in FIG. 19) may obtain one or more subband PRB offsets for transmitting the feedback in an uplink subband of an SBFD symbol associated with the common PUCCH resource, as described above in connection with FIGS. 4-14.

As further shown in FIG. 15, in some aspects, process 1500 may include transmitting the feedback in a first PRB for a first frequency hop in the uplink subband and in a second PRB for a second frequency hop in the uplink subband, based at least in part on the one or more subband PRB offsets (block 1530). For example, the UE (e.g., using communication manager 1908 and/or transmission component 1904 depicted in FIG. 19) may transmit the feedback in a first PRB for a first frequency hop in the uplink subband and in a second PRB for a second frequency hop in the uplink subband, based at least in part on the one or more subband PRB offsets, as described above in connection with FIGS. 4-14.

Process 1500 may include additional aspects, such as any single aspect or any combination of aspects described below and/or in connection with one or more other processes described elsewhere herein.

In a first aspect, obtaining the one or more subband PRB offsets includes receiving an indication of the one or more subband PRB offsets.

In a second aspect, alone or in combination with the first aspect, the indication is included in a broadcast configuration or an uplink subband configuration.

In a third aspect, alone or in combination with one or more of the first and second aspects, obtaining the one or more subband PRB offsets includes determining the one or more subband PRB offsets based at least in part on a common RB zero or an RB of an initial uplink bandwidth part.

In a fourth aspect, alone or in combination with one or more of the first through third aspects, obtaining the one or more subband PRB offsets includes obtaining the one or more subband PRB offsets specified in stored configuration information.

In a fifth aspect, alone or in combination with one or more of the first through fourth aspects, the one or more subband PRB offsets include a subband PRB offset, and the first PRB is the subband PRB offset from a first BWP PRB that is outside the uplink subband and the second PRB is the subband PRB offset from a second BWP PRB that is outside the uplink subband.

In a sixth aspect, alone or in combination with one or more of the first through fifth aspects, the one or more subband PRB offsets include a first subband PRB offset and a second subband PRB offset, and the first PRB is the first subband PRB offset from a first BWP PRB that is outside the uplink subband and the second PRB is the second subband PRB offset from a second BWP PRB that is outside the uplink subband.

In a seventh aspect, alone or in combination with one or more of the first through sixth aspects, the one or more subband PRB offsets include a subband PRB offset, and the first PRB is the subband PRB offset from a first BWP PRB that is outside the uplink subband and the second PRB is based at least in part on the first PRB plus a size of the uplink subband.

In an eighth aspect, alone or in combination with one or more of the first through seventh aspects, the one or more subband PRB offsets include a subband PRB offset from a first BWP PRB that is outside the uplink subband to a center of the uplink subband, where the first PRB is based at least in part on the center of the uplink subband minus a portion of a size of the uplink subband, and the second PRB is based at least in part on the center of the uplink subband plus the portion of the size of the uplink subband.

Although FIG. 15 shows example blocks of process 1500, in some aspects, process 1500 may include additional blocks, fewer blocks, different blocks, or differently arranged blocks than those depicted in FIG. 15. Additionally, or alternatively, two or more of the blocks of process 1500 may be performed in parallel.

FIG. 16 is a diagram illustrating an example process 1600 performed, for example, by a network entity, in accordance with the present disclosure. Example process 1600 is an example where the network entity (e.g., base station 110, network entity 1210) performs operations associated with receiving in PRBs in an uplink band of an SBFD symbol.

As shown in FIG. 16, in some aspects, process 1600 may include transmitting DCI that schedules a downlink message for initial access communication and that indicates a common PUCCH resource for feedback for the downlink message (block 1610). For example, the network entity (e.g., using communication manager 2008 and/or transmission component 2004 depicted in FIG. 20) may transmit DCI that schedules a downlink message for initial access communication and that indicates a common PUCCH resource for feedback for the downlink message, as described above in connection with FIGS. 4-14.

As further shown in FIG. 16, in some aspects, process 1600 may include receiving the feedback in a first PRB for a first frequency hop in an uplink subband of an SBFD symbol associated with the common PUCCH resource and in a second PRB for a second frequency hop in the uplink subband (block 1620). For example, the network entity (e.g., using communication manager 2008 and/or reception component 2002 depicted in FIG. 20) may receive the feedback in a first PRB for a first frequency hop in an uplink subband of an SBFD symbol associated with the common PUCCH resource and in a second PRB for a second frequency hop in the uplink subband, as described above in connection with FIGS. 4-14.

Process 1600 may include additional aspects, such as any single aspect or any combination of aspects described below and/or in connection with one or more other processes described elsewhere herein.

In a first aspect, process 1600 includes transmitting an indication of one or more subband PRB offsets that are associated with locating the first PRB and the second PRB.

In a second aspect, alone or in combination with the first aspect, the first PRB is a subband PRB offset from a first BWP PRB that is outside the uplink subband and the second PRB is the subband PRB offset from a second BWP PRB that is outside the uplink subband.

In a third aspect, alone or in combination with one or more of the first and second aspects, the first PRB is a first subband PRB offset from a first BWP PRB that is outside the uplink subband and the second PRB is a second subband PRB offset from a second BWP PRB that is outside the uplink subband.

In a fourth aspect, alone or in combination with one or more of the first through third aspects, the first PRB is a subband PRB offset from a first BWP PRB that is outside the uplink subband and the second PRB is based at least in part on the first PRB plus a size of the uplink subband.

In a fifth aspect, alone or in combination with one or more of the first through fourth aspects, the first PRB is based at least in part on a center of the uplink subband minus a portion of a size of the uplink subband, and the second PRB is based at least in part on the center of the uplink subband plus the portion of the size of the uplink subband.

Although FIG. 16 shows example blocks of process 1600, in some aspects, process 1600 may include additional blocks, fewer blocks, different blocks, or differently arranged blocks than those depicted in FIG. 16. Additionally, or alternatively, two or more of the blocks of process 1600 may be performed in parallel.

Figure 17:
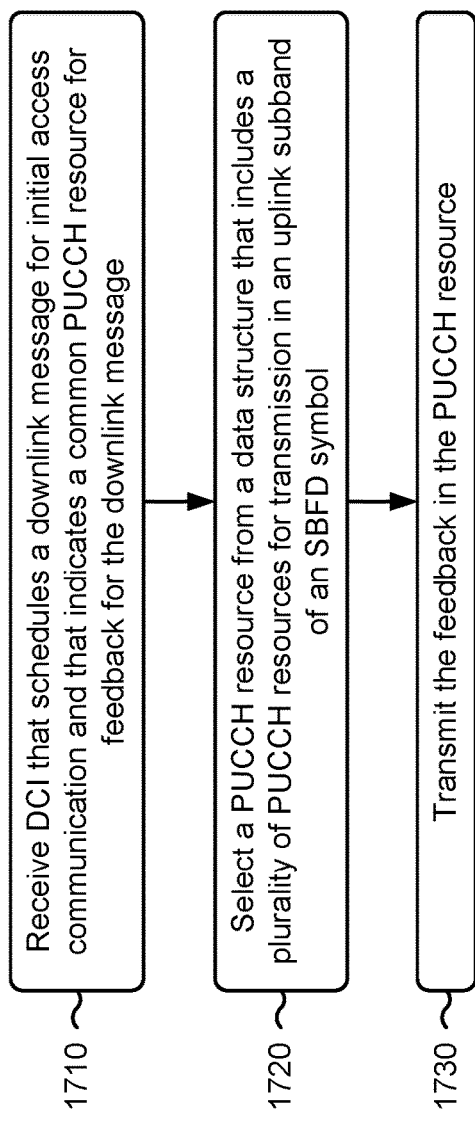
FIG. 17 is a diagram illustrating an example process performed, for example, by a UE, in accordance with the present disclosure.

FIG. 17 is a diagram illustrating an example process 1700 performed, for example, by a UE, in accordance with the present disclosure. Example process 1700 is an example where the UE (e.g., UE 120, UE 1220) performs operations associated with transmitting in PRBs in an uplink band of an SBFD symbol.

As shown in FIG. 17, in some aspects, process 1700 may include receiving DCI that schedules a downlink message for initial access communication and that indicates a common PUCCH resource for feedback for the downlink message (block 1710). For example, the UE (e.g., using communication manager 1908 and/or reception component 1902 depicted in FIG. 19) may receive DCI that schedules a downlink message for initial access communication and that indicates a common PUCCH resource for feedback for the downlink message, as described above in connection with FIGS. 4-14.

As further shown in FIG. 17, in some aspects, process 1700 may include selecting a PUCCH resource from a data structure that includes a plurality of PUCCH resources for transmission in an uplink subband of an SBFD symbol (block 1720). For example, the UE (e.g., using communication manager 1908 and/or selection component 1912 depicted in FIG. 19) may select a PUCCH resource from a data structure that includes a plurality of PUCCH resources for transmission in an uplink subband of an SBFD symbol, as described above in connection with FIGS. 4-14.

As further shown in FIG. 17, in some aspects, process 1700 may include transmitting the feedback in the selected PUCCH resource (block 1730). For example, the UE (e.g., using communication manager 1908 and/or transmission component 1904 depicted in FIG. 19) may transmit the feedback in the selected PUCCH resource, as described above in connection with FIGS. 4-14.

Process 1700 may include additional aspects, such as any single aspect or any combination of aspects described below and/or in connection with one or more other processes described elsewhere herein.

In a first aspect, the PUCCH resource is associated with a first PRB offset and a second PRB offset, and a first PRB of a first frequency hop is the first PRB offset from a first BWP PRB that is outside the uplink subband and a second PRB of a second frequency hop is the second PRB offset from a second BWP PRB that is outside the uplink subband.

In a second aspect, alone or in combination with the first aspect, selecting the PUCCH resource includes selecting a PUCCH resource index based at least in part on a slot type.

In a third aspect, alone or in combination with one or more of the first and second aspects, selecting the PUCCH resource includes selecting a PUCCH resource index based at least in part on a PUCCH resource indicator field in the DCI.

In a fourth aspect, alone or in combination with one or more of the first through third aspects, selecting the PUCCH resource includes selecting a PUCCH resource index based at least in part on a control channel element index.

In a fifth aspect, alone or in combination with one or more of the first through fourth aspects, the data structure includes more than 16 PUCCH resource indices.

Although FIG. 17 shows example blocks of process 1700, in some aspects, process 1700 may include additional blocks, fewer blocks, different blocks, or differently arranged blocks than those depicted in FIG. 17. Additionally, or alternatively, two or more of the blocks of process 1700 may be performed in parallel.

FIG. 18 is a diagram illustrating an example process 1800 performed, for example, by a UE, in accordance with the present disclosure. Example process 1800 is an example where the UE (e.g., UE 120, UE 1220) performs operations associated with transmitting in PRBs in an uplink band of an SBFD symbol.

As shown in FIG. 18, in some aspects, process 1800 may include receiving DCI that schedules a downlink message for initial access communication and that indicates a common PUCCH resource for feedback for the downlink message (block 1810). For example, the UE (e.g., using communication manager 1908 and/or reception component 1902 depicted in FIG. 19) may receive DCI that schedules a downlink message for initial access communication and that indicates a common PUCCH resource for feedback for the downlink message, as described above in connection with FIGS. 4-14.

As further shown in FIG. 18, in some aspects, process 1800 may include selecting a PUCCH resource set based at least in part on a slot type (block 1820). For example, the UE (e.g., using communication manager 1908 and/or selection component 1912 depicted in FIG. 19) may select a PUCCH resource set based at least in part on a slot type, as described above in connection with FIGS. 4-14.

As further shown in FIG. 18, in some aspects, process 1800 may include selecting a PUCCH resource based at least in part on an index within the PUCCH resource set (block 1830). For example, the UE (e.g., using communication manager 1908 and/or selection component 1912 depicted in FIG. 19) may select a PUCCH resource based at least in part on an index within the PUCCH resource set, as described above in connection with FIGS. 4-14.

As further shown in FIG. 18, in some aspects, process 1800 may include transmitting the feedback in a first PRB for a first frequency hop in an uplink subband of a subband full duplex symbol that is associated with the selected PUCCH resource and in a second PRB for a second frequency hop in the uplink subband (block 1840). For example, the UE (e.g., using communication manager 1908 and/or transmission component 1904 depicted in FIG. 19) may transmit the feedback in a first PRB for a first frequency hop in an uplink subband of a subband full duplex symbol that is associated with the selected PUCCH resource and in a second PRB for a second frequency hop in the uplink subband, as described above in connection with FIGS. 4-14.

Process 1800 may include additional aspects, such as any single aspect or any combination of aspects described below and/or in connection with one or more other processes described elsewhere herein.

In a first aspect, the PUCCH resource is associated with a first PRB offset and a second PRB offset, and a first PRB is the first PRB offset from a first BWP PRB that is outside the uplink subband and a second PRB is the second PRB subband offset from a second BWP PRB that is outside the uplink subband.

In a second aspect, alone or in combination with the first aspect, the PUCCH resource set is specific to SBFD slots, and selecting the PUCCH resource set includes selecting the PUCCH resource set based at least in part on an SBFD slot type.

Although FIG. 18 shows example blocks of process 1800, in some aspects, process 1800 may include additional blocks, fewer blocks, different blocks, or differently arranged blocks than those depicted in FIG. 18. Additionally, or alternatively, two or more of the blocks of process 1800 may be performed in parallel.

Figure 19:
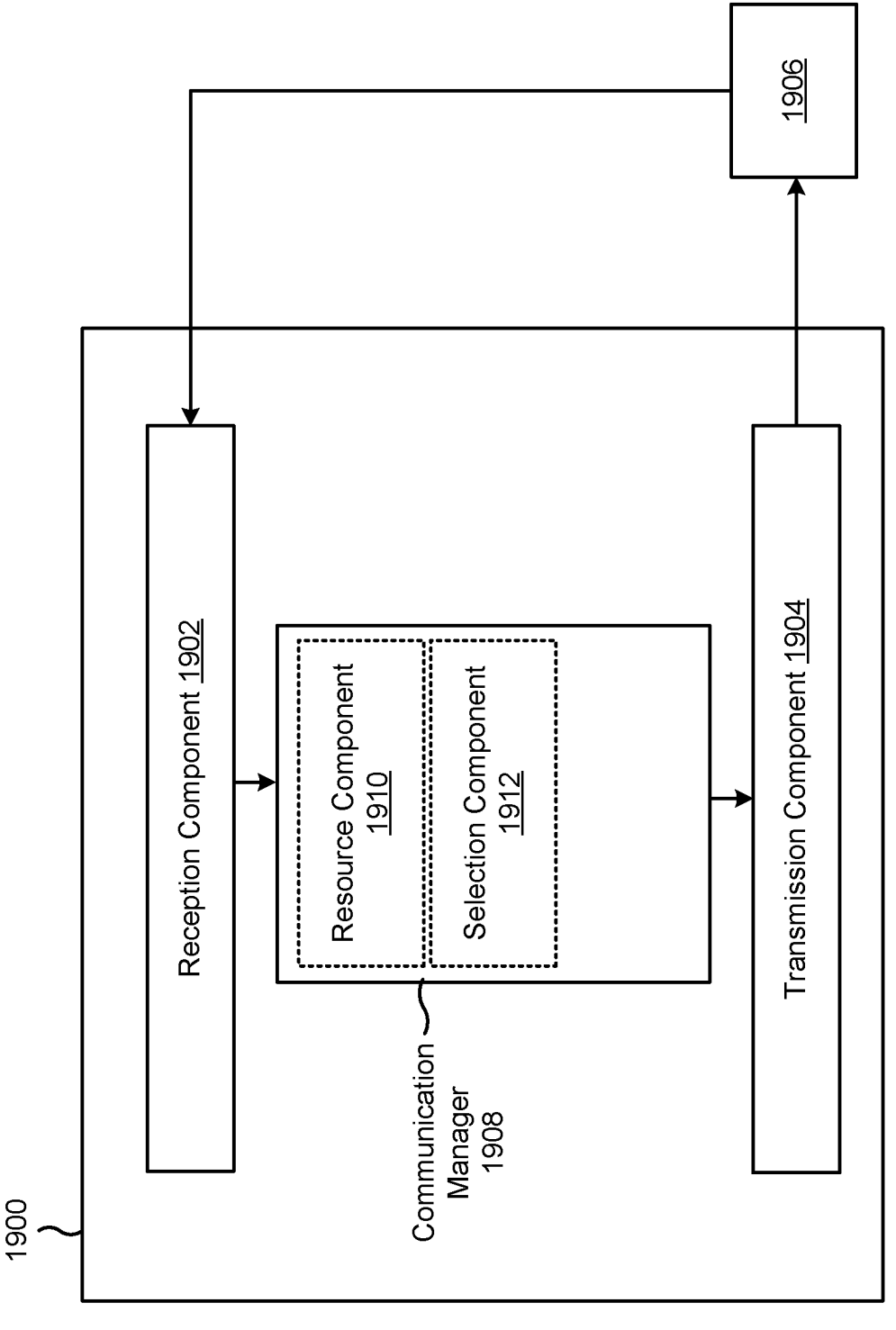
FIG. 19 is a diagram of an example apparatus for wireless communication, in accordance with the present disclosure.

FIG. 19 is a diagram of an example apparatus 1900 for wireless communication, in accordance with the present disclosure. The apparatus 1900 may be a UE (e.g., UE 120, UE 1220), or a UE may include the apparatus 1900. In some aspects, the apparatus 1900 includes a reception component 1902 and a transmission component 1904, which may be in communication with one another (for example, via one or more buses and/or one or more other components). As shown, the apparatus 1900 may communicate with another apparatus 1906 (such as a UE, a base station, or another wireless communication device) using the reception component 1902 and the transmission component 1904. As further shown, the apparatus 1900 may include the communication manager 1908. The communication manager 1908 may control and/or otherwise manage one or more operations of the reception component 1902 and/or the transmission component 1904. In some aspects, the communication manager 1908 may include one or more antennas, a modem, a controller/processor, a memory, or a combination thereof, of the UE described in connection with FIG. 2. The communication manager 1908 may be, or be similar to, the communication manager 140 depicted in FIGS. 1 and 2. For example, in some aspects, the communication manager 1908 may be configured to perform one or more of the functions described as being performed by the communication manager 140. In some aspects, the communication manager 1908 may include the reception component 1902 and/or the transmission component 1904. The communication manager 1908 may include a resource component 1910 and/or a selection component 1912, among other examples.

In some aspects, the apparatus 1900 may be configured to perform one or more operations described herein in connection with FIGS. 1-14. Additionally, or alternatively, the apparatus 1900 may be configured to perform one or more processes described herein, such as process 1500 of FIG. 15, process 1700 of FIG. 17, process 1800 of FIG. 18, or a combination thereof. In some aspects, the apparatus 1900 and/or one or more components shown in FIG. 19 may include one or more components of the UE described in connection with FIG. 2. Additionally, or alternatively, one or more components shown in FIG. 19 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 1902 may receive communications, such as reference signals, control information, data communications, or a combination thereof, from the apparatus 1906. The reception component 1902 may provide received communications to one or more other components of the apparatus 1900. In some aspects, the reception component 1902 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 1900. In some aspects, the reception component 1902 may include one or more antennas, a modem, a demodulator, a MIMO detector, a receive processor, a controller/processor, a memory, or a combination thereof, of the UE described in connection with FIG. 2.

The transmission component 1904 may transmit communications, such as reference signals, control information, data communications, or a combination thereof, to the apparatus 1906. In some aspects, one or more other components of the apparatus 1900 may generate communications and may provide the generated communications to the transmission component 1904 for transmission to the apparatus 1906. In some aspects, the transmission component 1904 may perform signal processing on the generated communications (such as filtering, amplification, modulation, digital-to-analog conversion, multiplexing, interleaving, mapping, or encoding, among other examples), and may transmit the processed signals to the apparatus 1906. In some aspects, the transmission component 1904 may include one or more antennas, a modem, a modulator, a transmit MIMO processor, a transmit processor, a controller/processor, a memory, or a combination thereof, of the UE described in connection with FIG. 2. In some aspects, the transmission component 1904 may be co-located with the reception component 1902 in a transceiver.

In some aspects, the reception component 1902 may receive DCI that schedules a downlink message for initial access communication and that indicates a common PUCCH resource for feedback for the downlink message. The resource component 1910 and/or the reception component 1902 may obtain one or more subband PRB offsets for transmitting the feedback in an uplink subband of an SBFD symbol associated with the common PUCCH resource. The transmission component 1904 may transmit the feedback in a first PRB for a first frequency hop in the uplink subband and in a second PRB for a second frequency hop in the uplink subband, based at least in part on the one or more subband PRB offsets.

In some aspects, the reception component 1902 may receive DCI that schedules a downlink message for initial access communication and that indicates a common PUCCH resource for feedback for the downlink message. The selection component 1912 may select a PUCCH resource from a data structure that includes a plurality of PUCCH resources for transmission in an uplink subband of an SBFD symbol. The transmission component 1904 may transmit the feedback in the selected PUCCH resource.

In some aspects, the reception component 1902 may receive DCI that schedules a downlink message for initial access communication and that indicates a common PUCCH resource for feedback for the downlink message. The selection component 1912 may select a PUCCH resource set based at least in part on a slot type. The selection component 1912 may select a PUCCH resource based at least in part on an index within the PUCCH resource set. The transmission component 1904 may transmit the feedback in a first PRB for a first frequency hop in an uplink subband of an SBFD symbol that is associated with the selected PUCCH resource and in a second PRB for a second frequency hop in the uplink subband.

The number and arrangement of components shown in FIG. 19 are provided as an example. In practice, there may be additional components, fewer components, different components, or differently arranged components than those shown in FIG. 19. Furthermore, two or more components shown in FIG. 19 may be implemented within a single component, or a single component shown in FIG. 19 may be implemented as multiple, distributed components. Additionally, or alternatively, a set of (one or more) components shown in FIG. 19 may perform one or more functions described as being performed by another set of components shown in FIG. 19.

Figure 20:
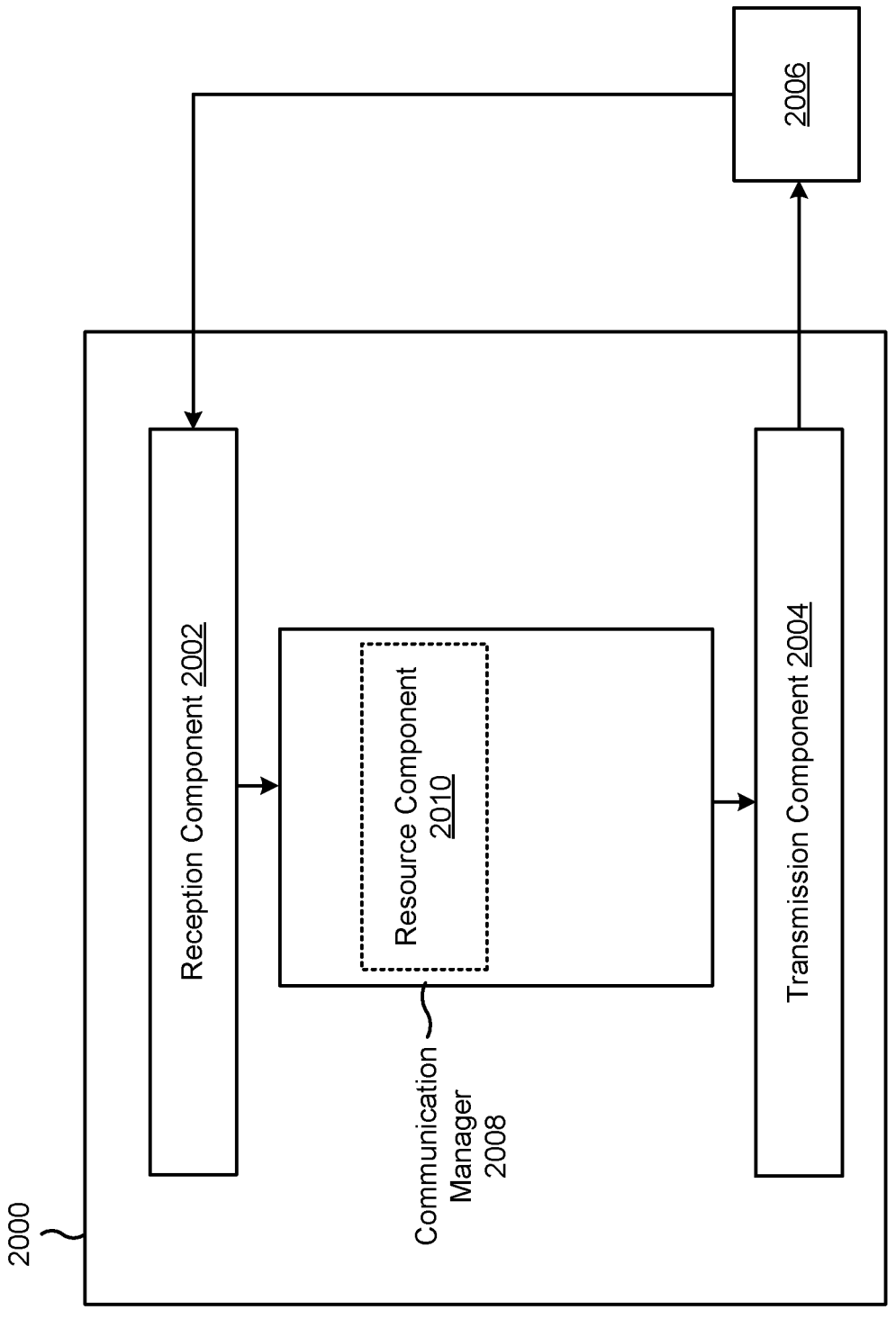
FIG. 20 is a diagram of an example apparatus for wireless communication, in accordance with the present disclosure.

FIG. 20 is a diagram of an example apparatus 2000 for wireless communication, in accordance with the present disclosure. The apparatus 2000 may be a network entity, or a network entity may include the apparatus 2000. In some aspects, the apparatus 2000 includes a reception component 2002 and a transmission component 2004, which may be in communication with one another (for example, via one or more buses and/or one or more other components). As shown, the apparatus 2000 may communicate with another apparatus 2006 (such as a UE, a base station, or another wireless communication device) using the reception component 2002 and the transmission component 2004. As further shown, the apparatus 2000 may include the communication manager 2008. The communication manager 2008 may control and/or otherwise manage one or more operations of the reception component 2002 and/or the transmission component 2004. In some aspects, the communication manager 2008 may include one or more antennas, a modem, a controller/processor, a memory, or a combination thereof, of the network entity described in connection with FIG. 2. The communication manager 2008 may be, or be similar to, the communication manager 150 depicted in FIGS. 1 and 2. For example, in some aspects, the communication manager 2008 may be configured to perform one or more of the functions described as being performed by the communication manager 150. In some aspects, the communication manager 2008 may include the reception component 2002 and/or the transmission component 2004. The communication manager 2008 may include resource component 2010, among other examples.

In some aspects, the apparatus 2000 may be configured to perform one or more operations described herein in connection with FIG. 200. Additionally, or alternatively, the apparatus 2000 may be configured to perform one or more processes described herein, such as process 1600 of FIG. 16. In some aspects, the apparatus 2000 and/or one or more components shown in FIG. 20 may include one or more components of the network entity described in connection with FIG. 2. Additionally, or alternatively, one or more components shown in FIG. 20 may be implemented within one or more components described in connection with FIG. 2. Additionally, or alternatively, one or more components of the set of components may be implemented at least in part as software stored in a memory. For example, a component (or a portion of a component) may be implemented as instructions or code stored in a non-transitory computer-readable medium and executable by a controller or a processor to perform the functions or operations of the component.

The reception component 2002 may receive communications, such as reference signals, control information, data communications, or a combination thereof, from the apparatus 2006. The reception component 2002 may provide received communications to one or more other components of the apparatus 2000. In some aspects, the reception component 2002 may perform signal processing on the received communications (such as filtering, amplification, demodulation, analog-to-digital conversion, demultiplexing, deinterleaving, de-mapping, equalization, interference cancellation, or decoding, among other examples), and may provide the processed signals to the one or more other components of the apparatus 2000. In some aspects, the reception component 2002 may include one or more antennas, a modem, a demodulator, a MIMO detector, a receive processor, a controller/processor, a memory, or a combination thereof, of the network entity described in connection with FIG. 2.

The transmission component 2004 may transmit communications, such as reference signals, control information, data communications, or a combination thereof, to the apparatus 2006. In some aspects, one or more other components of the apparatus 2000 may generate communications and may provide the generated communications to the transmission component 2004 for transmission to the apparatus 2006. In some aspects, the transmission component 2004 may perform signal processing on the generated communications (such as filtering, amplification, modulation, digital-to-analog conversion, multiplexing, interleaving, mapping, or encoding, among other examples), and may transmit the processed signals to the apparatus 2006. In some aspects, the transmission component 2004 may include one or more antennas, a modem, a modulator, a transmit MIMO processor, a transmit processor, a controller/processor, a memory, or a combination thereof, of the network entity described in connection with FIG. 2. In some aspects, the transmission component 2004 may be co-located with the reception component 2002 in a transceiver.

In some aspects, the transmission component 2004 may transmit DCI that schedules a downlink message for initial access communication and that indicates a common PUCCH resource for feedback for the downlink message. The resource component 2010 may determine the common PUCCH resource. The reception component 2002 may receive the feedback in a first PRB for a first frequency hop in an uplink subband of an SBFD symbol associated with the common PUCCH resource and in a second PRB for a second frequency hop in the uplink subband. The transmission component 2004 may transmit an indication of one or more subband PRB offsets that are associated with locating the first PRB and the second PRB.

The number and arrangement of components shown in FIG. 20 are provided as an example. In practice, there may be additional components, fewer components, different components, or differently arranged components than those shown in FIG. 20. Furthermore, two or more components shown in FIG. 20 may be implemented within a single component, or a single component shown in FIG. 20 may be implemented as multiple, distributed components. Additionally, or alternatively, a set of (one or more) components shown in FIG. 20 may perform one or more functions described as being performed by another set of components shown in FIG. 20.

The following provides an overview of some Aspects of the present disclosure:

Aspect 1: A method of wireless communication performed by a user equipment (UE), comprising: receiving downlink control information (DCI) that schedules a downlink message for initial access communication and that indicates a common physical uplink control channel (PUCCH) resource for feedback for the downlink message; obtaining one or more subband physical resource block (PRB) offsets for transmitting the feedback in an uplink subband of a subband full duplex (SBFD) symbol associated with the common PUCCH resource; and transmitting the feedback in a first PRB for a first frequency hop in the uplink subband and in a second PRB for a second frequency hop in the uplink subband, based at least in part on the one or more subband PRB offsets.

Aspect 2: The method of Aspect 1, wherein obtaining the one or more subband PRB offsets includes receiving an indication of the one or more subband PRB offsets.

Aspect 3: The method of any of Aspects 1-2, wherein the indication is included in a broadcast configuration or an uplink subband configuration.

Aspect 4: The method of any of Aspects 1-3, wherein obtaining the one or more subband PRB offsets includes determining the one or more subband PRB offsets based at least in part on a common RB zero or an RB of an initial uplink bandwidth part.

Aspect 5: The method of any of Aspects 1-4, wherein obtaining the one or more subband PRB offsets includes obtaining the one or more subband PRB offsets specified in stored configuration information.

Aspect 6: The method of any of Aspects 1-5, wherein the one or more subband PRB offsets include a subband PRB offset, and wherein the first PRB is the subband PRB offset from a first bandwidth part (BWP) PRB that is outside the uplink subband and the second PRB is the subband PRB offset from a second BWP PRB that is outside the uplink subband.

Aspect 7: The method of any of Aspects 1-5, wherein the one or more subband PRB offsets include a first subband PRB offset and a second subband PRB offset, and wherein the first PRB is the first subband PRB offset from a first bandwidth part (BWP) PRB that is outside the uplink subband and the second PRB is the second subband PRB offset from a second BWP PRB that is outside the uplink subband.

Aspect 8: The method of any of Aspects 1-5, wherein the one or more subband PRB offsets include a subband PRB offset, and wherein the first PRB is the subband PRB offset from a first bandwidth part (BWP) PRB that is outside the uplink subband and the second PRB is based at least in part on the first PRB plus a size of the uplink subband.

Aspect 9: The method of any of Aspects 1-5, wherein the one or more subband PRB offsets include a subband PRB offset from a first bandwidth part (BWP) PRB that is outside the uplink subband to a center of the uplink subband, wherein the first PRB is based at least in part on the center of the uplink subband minus a portion of a size of the uplink subband, and wherein the second PRB is based at least in part on the center of the uplink subband plus the portion of the size of the uplink subband.

Aspect 10: A method of wireless communication performed by a network entity, comprising: transmitting downlink control information (DCI) that schedules a downlink message for initial access communication and that indicates a common physical uplink control channel (PUCCH) resource for feedback for the downlink message; and receiving the feedback in a first physical resource block (PRB) for a first frequency hop in an uplink subband of a subband full duplex (SBFD) symbol associated with the common PUCCH resource and in a second PRB for a second frequency hop in the uplink subband.

Aspect 11: The method of Aspect 10, further comprising transmitting an indication of one or more subband PRB offsets that are associated with locating the first PRB and the second PRB.

Aspect 12: The method of any of Aspects 10-11, wherein the first PRB is a subband PRB offset from a first bandwidth part (BWP) PRB that is outside the uplink subband and the second PRB is the subband PRB offset from a second BWP PRB that is outside the uplink subband.

Aspect 13: The method of any of Aspects 10-11, wherein the first PRB is the first subband PRB offset from a first bandwidth part (BWP) PRB that is outside the uplink subband and the second PRB is the second subband PRB offset from a second BWP PRB that is outside the uplink subband.

Aspect 14: The method of any of Aspects 10-11, wherein the first PRB is a subband PRB offset from a first bandwidth part (BWP) PRB that is outside the uplink subband and the second PRB is based at least in part on the first PRB plus a size of the uplink subband.

Aspect 15: The method of any of Aspects 10-11, wherein the first PRB is based at least in part on a center of the uplink subband minus a portion of a size of the uplink subband, and wherein the second PRB is based at least in part on the center of the uplink subband plus the portion of the size of the uplink subband.

Aspect 16: The method of any of Aspects 10-15, further comprising selecting a PUCCH resource that is associated with a first physical resource block (PRB) offset and a second PRB offset, and wherein a first PRB of a first frequency hop is the first PRB offset from a first bandwidth part (BWP) PRB that is outside the uplink subband and a second PRB of a second frequency hop is the second PRB offset from a second BWP PRB that is outside the uplink subband.

Aspect 17: The method of Aspect 16, wherein selecting the PUCCH resource includes selecting a PUCCH resource index based at least in part on a slot type.

Aspect 18: The method of Aspect 16, wherein selecting the PUCCH resource includes selecting a PUCCH resource index based at least in part on a PUCCH resource indicator field in the DCI.

Aspect 19: The method of Aspect 16, wherein selecting the PUCCH resource includes selecting a PUCCH resource index based at least in part on a control channel element index.

Aspect 20: The method of Aspect 16, wherein selecting the PUCCH resource includes selecting the PUCCH resource from a data structure that includes more than 16 PUCCH resource indices.

Aspect 21: The method of Aspect 16, wherein selecting the PUCCH resource includes selecting the PUCCH resource from a PUCCH resource set, wherein the PUCCH resource set is specific to subband full duplex (SBFD) slots, and wherein the one or more processors are individually or collectively configured to cause the UE to select the PUCCH resource set based at least in part on an SBFD slot type.

Aspect 22: A method of wireless communication performed by a user equipment (UE), comprising: receiving downlink control information (DCI) that schedules a downlink message for initial access communication and that indicates a common physical uplink control channel (PUCCH) resource for feedback for the downlink message; selecting a PUCCH resource from a data structure that includes a plurality of PUCCH resources for transmission in an uplink subband of a subband full duplex (SBFD) symbol; and transmitting the feedback in the selected PUCCH resource.

Aspect 23: The method of Aspect 22, wherein the PUCCH resource is associated with a first physical resource block (PRB) offset and a second PRB offset, and wherein a first PRB of a first frequency hop is the first PRB offset from a first bandwidth part (BWP) PRB that is outside the uplink subband and a second PRB of a second frequency hop is the second PRB offset from a second BWP PRB that is outside the uplink subband.

Aspect 24: The method of any of Aspects 22-23, wherein selecting the PUCCH resource includes selecting a PUCCH resource index based at least in part on a slot type.

Aspect 25: The method of any of Aspects 22-24, wherein selecting the PUCCH resource includes selecting a PUCCH resource index based at least in part on a PUCCH resource indicator field in the DCI.

Aspect 26: The method of any of Aspects 22-25, wherein selecting the PUCCH resource includes selecting a PUCCH resource index based at least in part on a control channel element index.

Aspect 27: The method of any of Aspects 22-26, wherein the data structure includes more than 16 PUCCH resource indices.

Aspect 28: A method of wireless communication performed by a user equipment (UE), comprising: receiving downlink control information (DCI) that schedules a downlink message for initial access communication and that indicates a common physical uplink control channel (PUCCH) resource for feedback for the downlink message; selecting a PUCCH resource set based at least in part on a slot type; selecting a PUCCH resource based at least in part on an index within the PUCCH resource set; and transmitting the feedback in a first physical resource block (PRB) for a first frequency hop in an uplink subband of a subband full duplex symbol that is associated with the selected PUCCH resource and in a second PRB for a second frequency hop in the uplink subband.

Aspect 29: The method of Aspect 28, wherein the PUCCH resource is associated with a first PRB offset and a second PRB offset, and wherein a first PRB is the first PRB offset from a first bandwidth part (BWP) PRB that is outside the uplink subband and a second PRB is the second PRB subband offset from a second BWP PRB that is outside the uplink subband.

Aspect 30: The method of any of Aspects 28-29, wherein the PUCCH resource set is specific to subband full duplex (SBFD) slots, and wherein selecting the PUCCH resource set includes selecting the PUCCH resource set based at least in part on an SBFD slot type.

Aspect 31: An apparatus for wireless communication at a device, comprising a processor; memory coupled with the processor; and instructions stored in the memory and executable by the processor to cause the apparatus to perform the method of one or more of Aspects 1-30.

Aspect 32: A device for wireless communication, comprising a memory and one or more processors coupled to the memory, the one or more processors configured to perform the method of one or more of Aspects 1-30.

Aspect 33: An apparatus for wireless communication, comprising at least one means for performing the method of one or more of Aspects 1-30.

Aspect 34: A non-transitory computer-readable medium storing code for wireless communication, the code comprising instructions executable by a processor to perform the method of one or more of Aspects 1-30.

Aspect 35: A non-transitory computer-readable medium storing a set of instructions for wireless communication, the set of instructions comprising one or more instructions that, when executed by one or more processors of a device, cause the device to perform the method of one or more of Aspects 1-30.

The foregoing disclosure provides illustration and description but is not intended to be exhaustive or to limit the aspects to the precise forms disclosed. Modifications and variations may be made in light of the above disclosure or may be acquired from practice of the aspects.

As used herein, the term "component" is intended to be broadly construed as hardware or a combination of hardware and software. "Software" shall be construed broadly to mean instructions, instruction sets, code, code segments, program code, programs, subprograms, software modules, applications, software applications, software packages, routines, subroutines, objects, executables, threads of execution, procedures, or functions, among other examples, whether referred to as software, firmware, middleware, microcode, hardware description language, or otherwise. As used herein, a "processor" is implemented in hardware or a combination of hardware and software. It will be apparent that systems or methods described herein may be implemented in different forms of hardware or a combination of hardware and software. The actual specialized control hardware or software code used to implement these systems or methods is not limiting of the aspects. Thus, the operation and behavior of the systems or methods are described herein without reference to specific software code, because those skilled in the art will understand that software and hardware can be designed to implement the systems or methods based, at least in part, on the description herein.

As used herein, "satisfying a threshold" may, depending on the context, refer to a value being greater than the threshold, greater than or equal to the threshold, less than the threshold, less than or equal to the threshold, equal to the threshold, or not equal to the threshold, among other examples.

Even though particular combinations of features are recited in the claims or disclosed in the specification, these combinations are not intended to limit the disclosure of various aspects. Many of these features may be combined in ways not specifically recited in the claims or disclosed in the specification. The disclosure of various aspects includes each dependent claim in combination with every other claim in the claim set. As used herein, a phrase referring to "at least one of" a list of items refers to any combination of those items, including single members. As an example, "at least one of: a, b, or c" is intended to cover a, b, c, a+b, a+c, b+c, and a+b+c, as well as any combination with multiples of the same element (e.g., a+a, a+a+a, a+a+b, a+a+c, a+b+b, a+c+c, b+b, b+b+b, b+b+c, c+c, and c+c+c, or any other ordering of a, b, and c).

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the terms "set" and "group" are intended to include one or more items and may be used interchangeably with "one or more." Where only one item is intended, the phrase "only one" or similar language is used. Also, as used herein, the terms "has," "have," "having," and similar terms are intended to be open-ended terms that do not limit an element that they modify (e.g., an element "having" A may also have B). Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

What is claimed is:

1. A user equipment (UE) for wireless communication, comprising:
   one or more memories; and
   one or more processors coupled to the one or more memories, the one or more processors individually or collectively configured to cause the UE to:
   receive downlink control information (DCI) that schedules a downlink message for initial access communication and that indicates a common physical uplink control channel (PUCCH) resource for feedback for the downlink message;
   obtain one or more subband physical resource block (PRB) offsets for transmitting the feedback in an uplink subband of a subband full duplex (SBFD) symbol associated with the common PUCCH resource; and
   transmit the feedback in a first PRB for a first frequency hop in the uplink subband and in a second PRB for a second frequency hop in the uplink subband, based at least in part on the one or more subband PRB offsets, wherein the one or more subband PRB offsets include a subband PRB offset, and wherein the first PRB is the subband PRB offset from a first bandwidth part (BWP) PRB and the second PRB is based at least in part on the first PRB plus a size of the uplink subband.

2. The UE of claim 1, wherein the one or more processors, to obtain the one or more subband PRB offsets, are individually or collectively configured to cause the UE to receive an indication of the one or more subband PRB offsets.

3. The UE of claim 1, wherein the indication is included in a broadcast configuration or an uplink subband configuration.

4. The UE of claim 1, wherein the one or more processors, to obtain the one or more subband PRB offsets, are individually or collectively configured to cause the UE to determine the one or more subband PRB offsets based at least in part on a common RB zero or an RB of an initial uplink bandwidth part.

5. The UE of claim 1, wherein the one or more processors, to obtain the one or more subband PRB offsets, are individually or collectively configured to cause the UE to obtain the one or more subband PRB offsets specified in stored configuration information.

6. The UE of claim 1, wherein the one or more subband PRB offsets include a subband PRB offset, and wherein the first PRB is the subband PRB offset from a first bandwidth part (BWP) PRB that is outside the uplink subband and the second PRB is the subband PRB offset from a second BWP PRB that is outside the uplink subband.

7. The UE of claim 1, wherein the one or more subband PRB offsets include a first subband PRB offset and a second subband PRB offset, and wherein the first PRB is the first subband PRB offset from a first bandwidth part (BWP) PRB that is outside the uplink subband and the second PRB is the second subband PRB offset from a second BWP PRB that is outside the uplink subband.

8. The UE of claim 1, wherein the one or more subband PRB offsets include a subband PRB offset from a first bandwidth part (BWP) PRB that is outside the uplink subband to a center of the uplink subband, wherein the first PRB is based at least in part on the center of the uplink subband minus a portion of a size of the uplink subband, and wherein the second PRB is based at least in part on the center of the uplink subband plus the portion of the size of the uplink subband.

9. The UE of claim 8, wherein the one or more processors are individually or collectively configured to cause the UE to transmit an indication of one or more subband PRB offsets that are associated with locating the first PRB and the second PRB.

10. A network entity for wireless communication, comprising:

one or more memories; and one or more processors coupled to the one or more memories, the one or more processors individually or collectively configured to cause the network entity to:

transmit downlink control information (DCI) that schedules a downlink message for initial access communication and that indicates a common physical uplink control channel (PUCCH) resource for feedback for the downlink message; and receive the feedback in a first physical resource block (PRB) for a first frequency hop in an uplink subband of a subband full duplex (SBFD) symbol associated with the common PUCCH resource and in a second PRB for a second frequency hop in the uplink subband, wherein the first PRB is a subband PRB offset from a first bandwidth part (BWP) PRB and the second PRB is based at least in part on the first PRB plus a size of the uplink subband.

11. The network entity of claim 10, wherein the first PRB is a first subband PRB offset from a first bandwidth part (BWP) PRB that is outside the uplink subband and the second PRB is a second subband PRB offset from a second BWP PRB that is outside the uplink subband.

12. The network entity of claim 10, wherein the first PRB is a subband PRB offset from a first bandwidth part (BWP) PRB that is outside the uplink subband and the second PRB is based at least in part on the first PRB plus a size of the uplink subband.

13. The network entity of claim 10, wherein the first PRB is based at least in part on a center of the uplink subband minus a portion of a size of the uplink subband, and wherein the second PRB is based at least in part on the center of the uplink subband plus the portion of the size of the uplink subband.

14. The network entity of claim 13, wherein the one or more processors are individually or collectively configured to cause the network entity to select a PUCCH resource that is associated with a first physical resource block (PRB) offset and a second PRB offset, and wherein a first PRB of a first frequency hop is the first PRB offset from a first bandwidth part (BWP) PRB that is outside the uplink subband and a second PRB of a second frequency hop is the second PRB offset from a second BWP PRB that is outside the uplink subband.

15. The network entity of claim 14, wherein the one or more processors, to select the PUCCH resource, are individually or collectively configured to cause the network entity to select a PUCCH resource index based at least in part on a slot type.

16. The network entity of claim 14, wherein the one or more processors, to select the PUCCH resource, are individually or collectively configured to cause the network entity to select a PUCCH resource index based at least in part on a PUCCH resource indicator field in the DCI.

17. The network entity of claim 14, wherein the one or more processors, to select the PUCCH resource, are individually or collectively configured to cause the network entity to select a PUCCH resource index based at least in part on a control channel element index.

18. The network entity of claim 14, wherein the one or more processors, to select the PUCCH resource, are individually or collectively configured to select the PUCCH resource from a data structure that includes more than 16 PUCCH resource indices.

19. The network entity of claim 14, wherein one or more processors, to select the PUCCH resource, are individually or collectively configured to select the PUCCH resource from a PUCCH resource set, wherein the PUCCH resource set is specific to subband full duplex (SBFD) slots, and wherein the one or more processors are individually or collectively configured to cause the network entity to select the PUCCH resource set based at least in part on an SBFD slot type.

20. A user equipment (UE) for wireless communication, comprising:

one or more memories; and one or more processors coupled to the one or more memories, the one or more processors individually or collectively configured to cause the UE to:

receive downlink control information (DCI) that schedules a downlink message for initial access communication and that indicates a common physical uplink control channel (PUCCH) resource for feedback for the downlink message;

select a PUCCH resource from a data structure that includes a plurality of PUCCH resources for transmission in an uplink subband of a subband full duplex (SBFD) symbol;

obtain one or more subband physical resource block (PRB) offsets for transmitting the feedback in an uplink subband of the SBFD symbol associated with the common PUCCH resource; and transmit the feedback in the PUCCH resource, wherein the one or more subband PRB offsets include a subband PRB offset, and wherein the first PRB is the subband PRB offset from a first bandwidth part (BWP) PRB and the second PRB is based at least in part on the first PRB plus a size of the uplink subband.

21. The UE of claim 20, wherein the PUCCH resource is associated with a first physical resource block (PRB) offset and a second PRB offset, and wherein a first PRB of a first frequency hop is the first PRB offset from a first bandwidth part (BWP) PRB that is outside the uplink subband and a second PRB of a second frequency hop is the second PRB offset from a second BWP PRB that is outside the uplink subband.

22. The UE of claim 20, wherein the one or more processors, to select the PUCCH resource, are individually or collectively configured to cause the UE to select a PUCCH resource index based at least in part on a slot type.

23. The UE of claim 20, wherein the one or more processors, to select the PUCCH resource, are individually or collectively configured to cause the UE to select a PUCCH resource index based at least in part on a PUCCH resource indicator field in the DCI.

24. The UE of claim 20, wherein the one or more processors, to select the PUCCH resource, are individually or collectively configured to cause the UE to select a PUCCH resource index based at least in part on a control channel element index.

25. The UE of claim 20, wherein the data structure includes more than 16 PUCCH resource indices.

26. A user equipment (UE) for wireless communication, comprising:

one or more memories; and one or more processors coupled to the one or more memories, the one or more processors individually or collectively configured to cause the UE to:

receive downlink control information (DCI) that schedules a downlink message for initial access communication and that indicates a common physical uplink control channel (PUCCH) resource for feedback for the downlink message;

select a PUCCH resource set based at least in part on a slot type;

select a PUCCH resource based at least in part on an index within the PUCCH resource set;

obtain one or more subband physical resource block (PRB) offsets for transmitting the feedback in an uplink subband of a subband full duplex (SBFD) symbol associated with the common PUCCH resource; and transmit the feedback in a first physical resource block (PRB) for a first frequency hop in an uplink subband of a subband full duplex symbol that is associated with the selected PUCCH resource and in a second PRB for a second frequency hop in the uplink subband, wherein the one or more subband PRB offsets include a subband PRB offset, and wherein the first PRB is the subband PRB offset from a first bandwidth part (BWP) PRB and the second PRB is based at least in part on the first PRB plus a size of the uplink subband.

27. The UE of claim 26, wherein the PUCCH resource is associated with a first PRB offset and a second PRB offset, and wherein a first PRB is the first PRB offset from a first bandwidth part (BWP) PRB that is outside the uplink subband and a second PRB is the second PRB subband offset from a second BWP PRB that is outside the uplink subband.

28. The UE of claim 26, wherein the PUCCH resource set is specific to subband full duplex (SBFD) slots, and wherein the one or more processors, to select the PUCCH resource set, are individually or collectively configured to cause the UE to select the PUCCH resource set based at least in part on an SBFD slot type.

* * * * *